United States Patent [19]
Wright et al.

[11] Patent Number: 4,732,822
[45] Date of Patent: Mar. 22, 1988

[54] INTERNAL ELECTROLYTE SUPPLY SYSTEM FOR RELIABLE TRANSPORT THROUGHOUT FUEL CELL STACKS

[75] Inventors: Maynard K. Wright, Bethel Park; Robert E. Downs, Monroeville, both of Pa.; Robert B. King, Westlake, Ohio

[73] Assignee: The United States of America as represented by the United States Department of Energy, Washington, D.C.

[21] Appl. No.: 940,320

[22] Filed: Dec. 10, 1986

[51] Int. Cl.⁴ ............................................. H01M 2/38
[52] U.S. Cl. ..................................... 429/34; 429/14; 429/38
[58] Field of Search ..................... 429/34, 38, 39, 14

[56] References Cited

U.S. PATENT DOCUMENTS

| | | | |
|---|---|---|---|
| 3,239,384 | 3/1966 | Meyers | 429/118 |
| 3,468,713 | 9/1969 | Mueller | 429/14 |
| 4,015,052 | 3/1977 | Cheron | 429/14 |
| 4,037,023 | 7/1977 | Grehier et al. | 429/12 |
| 4,168,349 | 9/1979 | Bruzzelli | 429/14 |
| 4,176,213 | 11/1979 | Van Linden | 429/12 |
| 4,243,731 | 1/1981 | Cherón | 429/13 |
| 4,276,355 | 6/1981 | Kothmann et al. | 429/26 |
| 4,292,379 | 9/1981 | Kothmann et al. | 429/17 |
| 4,324,844 | 4/1982 | Kothmann | 429/26 |
| 4,342,816 | 8/1982 | Kothmann et al. | 429/13 |
| 4,366,211 | 12/1982 | Pollack | 429/38 |
| 4,383,009 | 5/1983 | Kothmann | 429/39 |
| 4,414,291 | 11/1983 | Breault | 429/14 |
| 4,463,066 | 7/1984 | Adlhart et al. | 429/34 |
| 4,463,067 | 7/1984 | Feigenbaum | 429/34 |
| 4,463,068 | 7/1984 | Cohn et al. | 429/34 |
| 4,467,019 | 8/1984 | Feigenbaum | 429/34 |
| 4,481,266 | 11/1984 | Littauer et al. | 429/12 |
| 4,572,876 | 2/1986 | Spurrier | 429/34 |

FOREIGN PATENT DOCUMENTS 60-150560  8/1985  Japan .................................. 429/14

*Primary Examiner*—Aaron Weisstuch

[57] ABSTRACT

An improved internal electrolyte supply system in a fuel cell stack employs a variety of arrangements of grooves and passages in bipolar plates of the multiplicity of repeating fuel cells to route gravity-assisted flowing electrolyte throughout the stack. The grooves route electrolyte flow along series of first paths which extend horizontally through the cells between the plates thereof. The passages route electrolyte flow along series of second paths which extend vertically through the stack so as to supply electrolyte to the first paths in order to expose the electrolyte to the matrices of the cells. Five different embodiments of the supply system are disclosed. Some embodiments employ wicks in the grooves for facilitating transfer of the electrolyte to the matrices as well as providing support for the matrices. Additionally, the passages of some embodiments bypass certain of the grooves and supply electrolyte directly to other of the grooves. Some embodiments employ single grooves and others have dual grooves. Finally, in some embodiments the passages are connected to the grooves by a step which produces a cascading electrolyte flow.

61 Claims, 69 Drawing Figures

INTERNAL ELECTROLYTE SUPPLY SYSTEM FOR RELIABLE TRANSPORT THROUGHOUT FUEL CELL STACKS

CROSS REFERENCE TO RELATED APPLICATIONS

Reference is hereby made to the following copending applications dealing with related subject matter and assigned to the assignee of the present invention:

1. "Apparatus For Supplying Electrolyte To Fuel Cell Stacks" by F. R. Spurrier, assigned U.S. Ser. No. 718,773 and filed Apr. 1, 1985 now U.S. Pat. No. 4,572,876.

2. "Fuel Cell Plates With Skewed Process Channels For Uniform Distribution Of Stack Compression Load" by Samuel J. Granata, Jr. et al, assigned U.S. Ser. No. 804,415 and filed Dec. 14, 1985.

3. "Fuel Cell Plates With Improved Arrangement Of Process Channels For Enhanced Pressure Drop Across The Plates" by F. R. Spurrier et al, assigned U.S. Ser. No. 804,414 and filed Dec. 4, 1985.

BACKGROUND OF THE INVENTION

1. Field of the Invention

The present invention relates generally to a stack of fuel cells which convert the latent chemical energy of a fuel into electricity directly and, more particularly, is concerned with an improved internal electrolyte supply system for reliable transport of electrolyte throughout the fuel cell stack.

2. Description of the Prior Art

One common fuel cell system includes a plurality of subassemblies which except for the top and bottom subassemblies, each include two bipolar plates between which is supported two gas electrodes, one an anode and the other a cathode, and a matrix with an ion-conductive electrolyte, such as phosphoric acid, between the anode and cathode electrodes. The subassemblies, herein referred to as fuel cells, are oriented one atop another and electrically connected in series (alternate electron and ion paths) to form a fuel cell stack. The top end plate of the top subassembly and the bottom end plate of the bottom subassembly are each half-bipolar plates. Representative examples of such fuel cell system are disclosed in U.S. patents to Kothmann et al (U.S. Pat. Nos. 4,276,355; 4,342,816), Kothmann (U.S. Pat. Nos. 4,292,379; 4,324,844; 4,383,009) and Pollack (U.S. Pat. No. 4,366,211) which, with the exception of U.S. Pat. Nos. 4,342,816 and 4,383,009, are assigned to the assignee of the present invention.

Process gases, such as a fuel and an oxidant are supplied respectively to the anode and cathode electrodes via manifolds attached to the stack and channels defined in the bipolar plates. The fuel in the form of hydrogen atoms when supplied to the anode electrode dissociates into hydrogen ions and electrons. The electrons are transmitted from the anode electrode of a given cell across one bipolar plate to the cathode electrode of an adjacent cell, while the hydrogen ions migrate directly through the acidic electrolyte to the cathode electrode of the given cell, where they react with electrons transmitted to the cathode electrode across the other bipolar plate from the anode electrode of the other adjacent cell and with oxygen to form water. This is repeated at and between the cells throughout the stack with electrons then transferring from the last cathode electrode at one end of the stack to the last anode electrode at the other end of the stack in the form of an electrical current through an external circuit where useful work is produced.

The above-described phosphoric acid fuel cell stack for generating electric power is made up of hundreds of stacked plates, a majority being bipolar plates and a minority being cooling plates, which form a column approximately eight feet in height. Each anode electrode is located on the top side of a bipolar plate facing upward, whereas each cathode electrode is located on the bottom side thereof facing downward. Electrolyte is supplied to the fuel cells in the stack through fill holes at the top of the stack. Most of the plates have electrolyte flow grooves defined on the top surface along a pair of the opposite edges of the plate. These grooves are located below the matrix which is positioned between the electrodes of the cell and distribute the electrolyte across the cell. Also, the plates have vertical holes defined therethrough at selected ends of the grooves such that the grooves and holes form a pair of internal independent serpentine feed paths of electrolyte flow from the top fill holes downward through the fuel cell stack. Similar internal electrolyte supply systems with single serpentine feed path configurations are disclosed in above-cited U.S. Pat. No. 4,383,009 and U.S. Pat. No. 4,572,876 first application cross-referenced above, although in these systems the grooves are located such that the electrolyte flow path is above the matrix.

Problems have been encountered in fuel cell stacks having the above-described construction and electrolyte supply system, the latter being characterized as an internal electrolyte single pass supply system. For reasons not yet fully understood, electrolyte frequently does not feed very far down into the stack before it is stopped. This condition causes the fuel cells at the lower portion of the stack to be dry; without electrolyte the cells do not function as intended. Apparently, the electrolyte fails to move through a groove due to a blockage which results in hydrostatic pressure that damages some fuel cells by flooding and starves the balance of the cells lower down in the stack. Thus, because of the potential for blockage, the internal electrolyte single pass serpentine flow system although relatively simple in construction is unreliable in operation.

One proposed solution to the aforementioned problems is to feed electrolyte to the stack at many elevations from an external system of manifolds. However, this approach presents further problems of attaching the feed and drain lines to the plates and finding the space to put the supply tubes and manifolds.

Consequently, a need exists for an improved internal electrolyte supply system for the fuel cell stack which will ensure reliable flow of electrolyte to all fuel cells of the stack regardless of their particular elevation therein without creating a hydrostatic head in any cell which would cause flooding and electrolyte loss into the process grooves.

SUMMARY OF THE INVENTION

The present invention provides an improved internal electrolyte supply system designed to satisfy the aforementioned needs. The improved internal electrolyte supply system, as disclosed herein, includes several embodiments which meet the aforementioned needs. As will become clearly understood from the detailed description which follows, all of the embodiments are adapted for working together to facilitate reliable transport of electrolyte through a common fuel cell stack; however, some of the embodiments can be provided separately from others in different fuel cell stacks.

The improved internal electrolyte supply system of the present invention is much less complex and costly than an external system and more reliable than the prior internal single pass system. All of the embodiments of the electrolyte supply system of the present invention satisfy the basic requirements that: (1) electrolyte be fed internally to the fuel cells in the stack; (2) multiple accesses be provided to the electrolyte grooves along the stack height; and (3) head pressure developed in the electrolyte be limited.

Accordingly, the present invention relates to an improved internal electrolyte supply system in a fuel cell stack having electrolyte feed and drain means and a plurality of stacked fuel cells wherein each fuel cell includes bipolar plates separating the fuel cell from adjacent fuel cells of the stack and an electrolyte-containing matrix disposed between the plates. The improved internal electrolyte supply system interconnecting the feed and drain means, comprises: (a) first means defined repeatedly throughout the fuel cell stack for flowing electrolyte along a series of first paths each extending directly through at least one cell between the plates thereof so as to expose the electrolyte to the matrix of the cell; and (b) second means defined repeatedly throughout the fuel cell stack for flowing electrolyte along a series of second paths extending through the plates of the cell stack and by-passing respective ones of the first paths so as to supply electrolyte directly to respective others of the first paths without first going through the ones of the first paths.

More particularly, the first means includes at least one electrolyte flow groove defined in one side of one of the plates of each cell of the stack. Also, an electrolyte transport wick is disposed in the groove and engaged with the matrix of the respective cell for facilitating transfer of electrolyte to the matrix. The second means includes an electrolyte flow passage extending through each plate of the respective cells in spaced relation to the electrolyte flow groove defined therein. In some embodiments of the invention, the electrolyte flow passage is in non-communicative flow relation to the electrolyte flow groove, whereas in other embodiments the electrolyte flow passage is in communicative flow relation to the electrolyte flow groove. In certain of the latter embodiments, a step is defined in the plate between the electrolyte flow passage and groove which establishes the communicative flow relation and produces a cascading electrolyte flow therebetween.

Still further, in several embodiments, the first means includes at least a pair of electrolyte flow grooves defined in side-by-side communicative flow relation in one side of one of the plates of each cell of the stack. At least one and preferably a series of spaced apart cross channels are defined in the one side of the one cell plate between and interconnecting the pair of electrolyte flow grooves so as to provide the communicative flow relation therebetween. Also, the electrolyte transport wick is disposed in one of the grooves and the electrolyte flow passage of the second means extends through the respective cell plate in spaced relation to the electrolyte flow grooves defined therein.

First and second embodiments of the improved internal electrolyte supply system of the present invention comprise: (a) first means defined repeatedly throughout the fuel cell stack for flowing electrolyte along a series of first paths each extending in successive fashion directly through the cells of a first group thereof between the plates of the cells so as to expose the electrolyte to the matrices of the fist group of cells; and (b) second means defined repeatedly throughout the fuel cell stack for flowing electrolyte along a series of second paths extending through the plates of the cell stack and by-passing respective ones of the first paths so as to supply electrolyte directly to respective others of the first paths without first going through the ones of the first paths. More particularly, the first means includes at least one electrolyte flow groove defined in one side of each of the plates of the cells of the first group thereof, and the second means includes an electrolyte flow passage extending through the plates of the cells of the first group thereof in spaced non-communicative flow relation to the electrolyte flow grooves defined therein. Further, the first means includes an electrolyte flow opening extending through each of the plates of the cells of the first group thereof in communicative flow relation to the electrolyte flow groove defined therein. Specifically, the electrolyte flow openings are defined in communicative flow relation with alternating ones of opposite ends of the respective electrolyte flow grooves such that the electrolyte flow openings and grooves of the cells of the first group define the first flow path in a back and forth serpentine fashion in the first group cells.

The third embodiment of the improved internal electrolyte supply system of the present invention also includes: (a) first means defined repeatedly throughout the fuel cell stack for flowing electrolyte along a series of first paths each extending directly through one of the cells in the stack between the plates thereof so as to expose electrolyte to the matrix of the cell; (b) second means defined repeatedly throughout the fuel cell stack for flowing electrolyte along a series of second paths extending through the plates of the cell stack at opposite ends of the first paths, the second paths being in communicative flow relation to the first paths and adapted to supply electrolyte directly to the respective first paths; and (c) third means disposed at the opposite ends of each of the first paths and extending into the second paths for diverting electrolyte from the second paths to the first paths.

Third, fourth and fifth embodiments of the improved internal electrolyte supply system of the present invention comprise: (a) first means defined repeatedly throughout the fuel cell stack for flowing electrolyte along a series of first paths each extending directly through one of the cells in the stack between the plates thereof so as to expose the electrolyte to the matrix of the cell; (b) second means defined repeatedly throughout the fuel cell stack for flowing electrolyte along a series of second paths extending through the plates of the cell stack at opposite ends of the first paths, the second paths being in communicative flow relation to the first paths and adapted to supply electrolyte directly to the respective first paths; and (c) an electrolyte transport wick disposed along each of the first paths through the cells and engaged with the matrix of the respective cell for facilitating transfer of electrolyte thereto.

Finally, the fourth and fifth embodiments of the improved internal electrolyte supply system of the present invention comprise: (a) first means defined repeatedly throughout the fuel cell stack for flowing electrolyte along a series of first paths each extending directly through one of the cells in the stack between the plates thereof so as to expose the electrolyte to the matrix of the cell; (b) second means defined repeatedly throughout the fuel cell stack for flowing electrolyte along a series of second paths extending through the plates of the cell stack at opposite ends of the first paths, the second paths being in communicative flow relation to the first paths and adapted to supply electrolyte directly to the respective first paths; and (c) third means defined in the plates between the first and second means which establish the communicative flow relation and produce a cascading electrolyte flow therebetween.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

Figure 28:
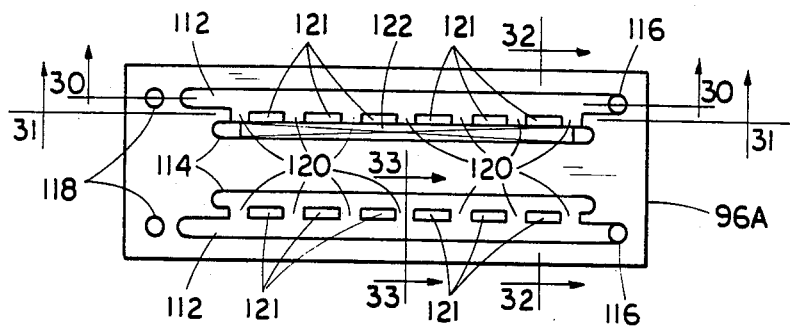
FIGS. 28 and 29 are plan views of respective top anode and bottom cathode sides of one bipolar plate of the stack of FIG. 27, the plate having electrolyte flow passages spaced from the left ends of the respective pairs of electrolyte flow grooves and electrolyte flow holes disposed at the right ends of one of the respective grooves of each pair, a transport wick is shown in only one of the grooves.
Figure 33:
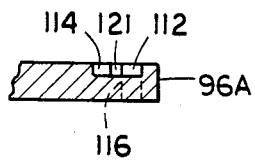
Figure 32:
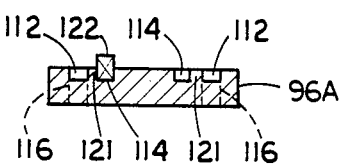
FIG. 32 is still another cross-sectional view of the same bipolar plate taken along line 32—32 of FIG. 28 across the pairs of dual electrolyte flow grooves and electrolyte transport wick of the plate.

FIG. 33 is yet another fragmentary cross-sectional view of the same bipolar plate taken along line 33—33 of FIG. 28 across the other dual electrolyte flow grooves of the plate.

Figure 27:
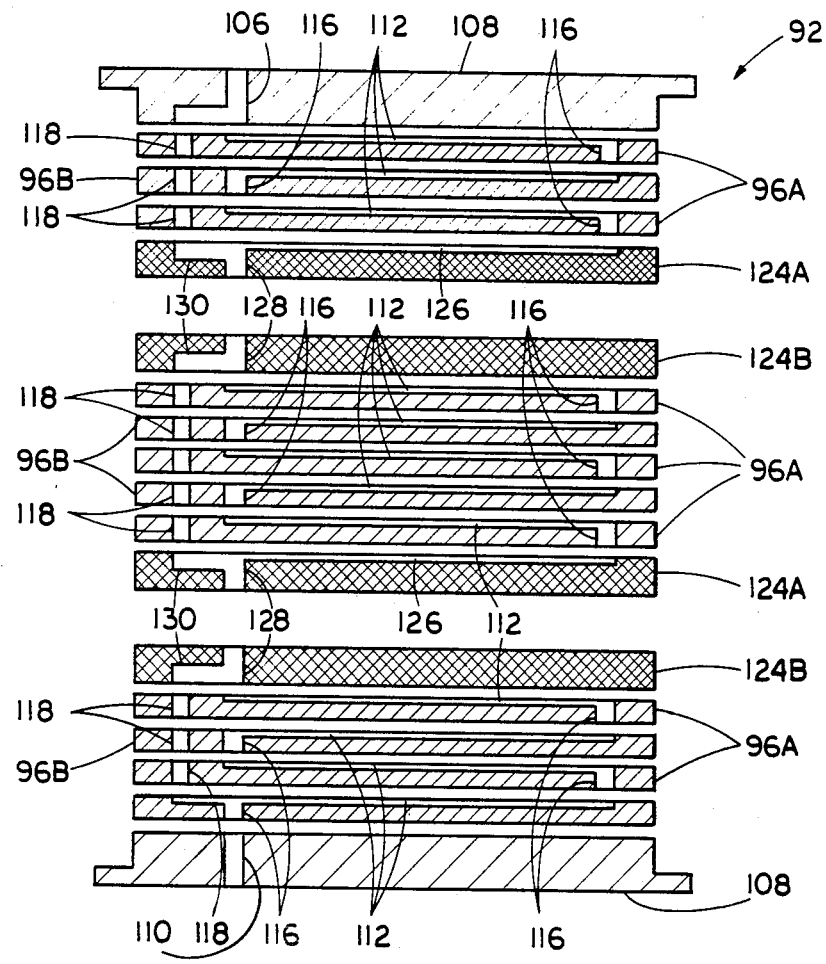
FIG. 27 is diagrammatic side elevational view, in vertically foreshortened form, of a fuel cell stack employing a second embodiment of the improved internal electrolyte supply system of the present invention having by-pass electrolyte flow passages and a pair of dual electrolyte flow grooves on the anode side of one bipolar plate of the cell stack, the electrolyte transport wicks located in the grooves are not shown in the sake of clarity.
Figure 34:
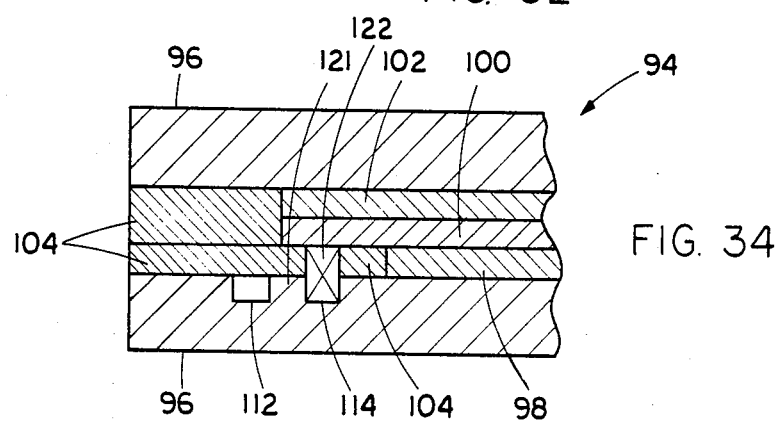

FIG. 34 is an enlarged fragmentary cross-sectional view of a typical fuel cell of the stack of FIG. 27.

Figure 35:
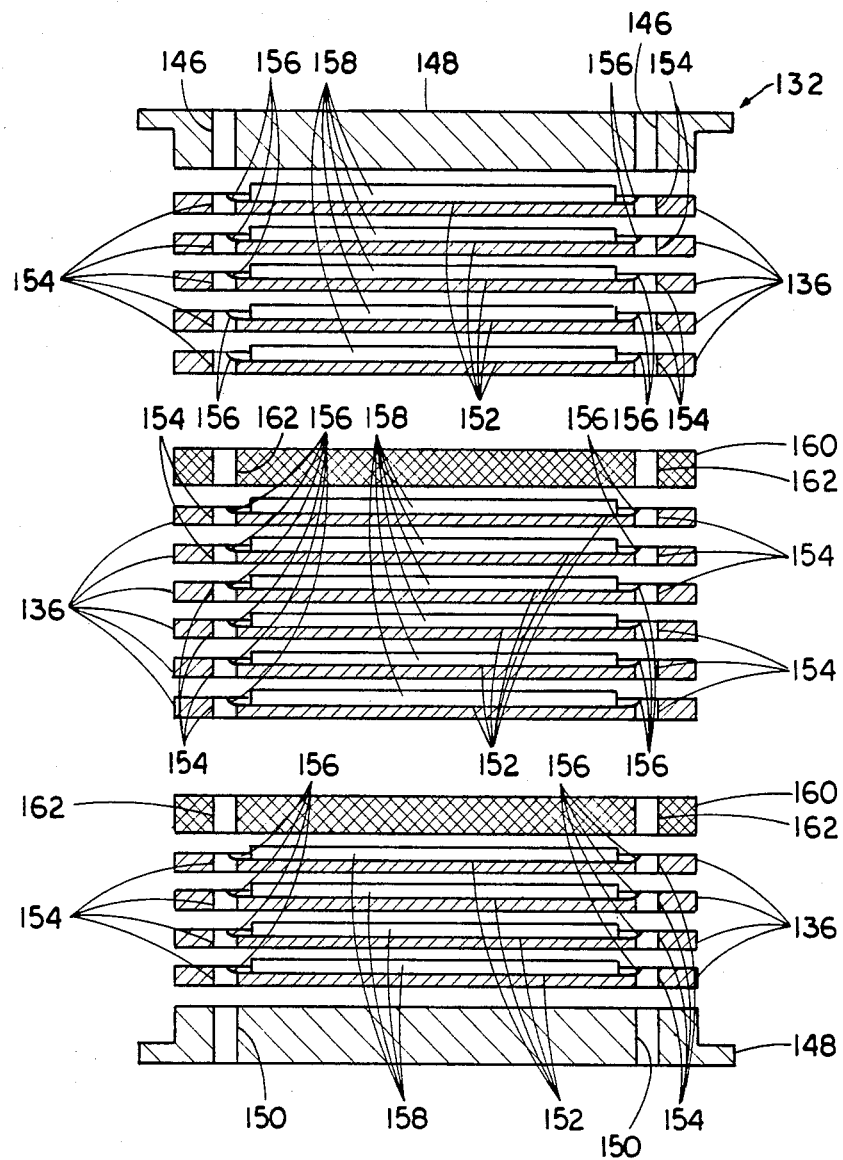

FIG. 35 is diagrammatic side elevational view, in vertically foreshortened form, of a fuel cell stack employing a third embodiment of the improved internal electrolyte supply system of the present invention having single pass electrolyte flow passages at opposite ends of the single electrolyte flow grooves on the anode side of one bipolar plate of the cell stack with electrolyte transport wicks in the grooves.

Figure 36:
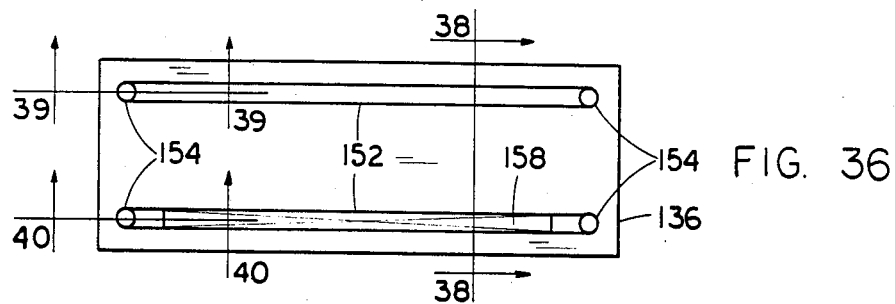
Figure 37:
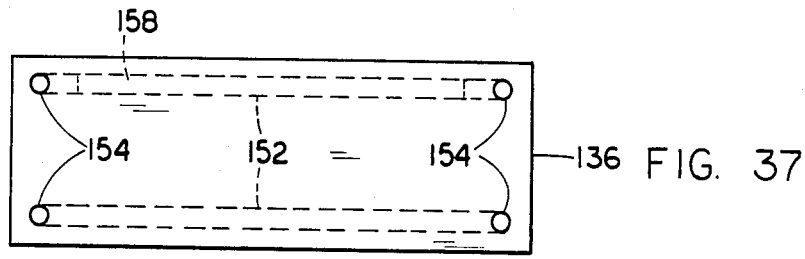

FIGS. 36 and 37 are plan views of respective top anode and bottom cathode sides of one bipolar plate of the stack of FIG. 35, the plate having electrolyte flow passages at the opposite ends of the respective single electrolyte flow grooves, a transport wick is shown in only one of the grooves.

Figure 38:
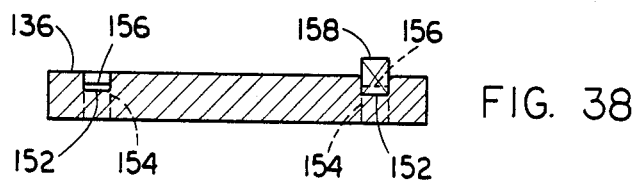

FIG. 38 is a cross-sectional view of one of the bipolar plates of the stack of FIG. 35 taken along line 38—38 of FIG. 36 across the respective electrolyte flow grooves of the plate.

Figure 39:
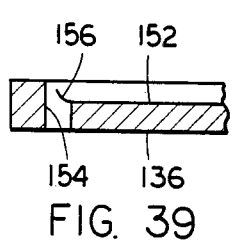

FIG. 39 is a fragmentary longitudinal sectional view of the same bipolar plate taken along line 39—39 of FIG. 36 through one single electrolyte flow groove and passage of the plate.

Figure 40:
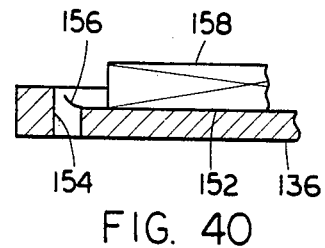

FIG. 40 is another fragmentary longitudinal sectional view of the same bipolar plate taken along line 40—40 of FIG. 36 through the other groove, passage and electrolyte transport wick in the groove.

Figure 41:
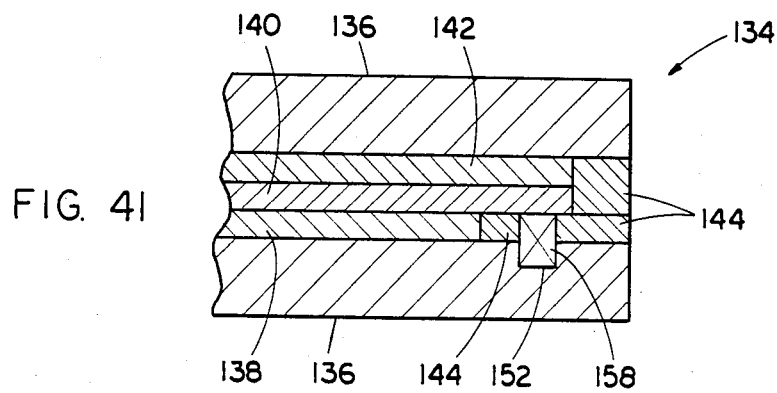

FIG. 41 is an enlarged fragmentary cross-sectional view of a typical fuel cell of the stack of FIG. 35.

Figure 42:
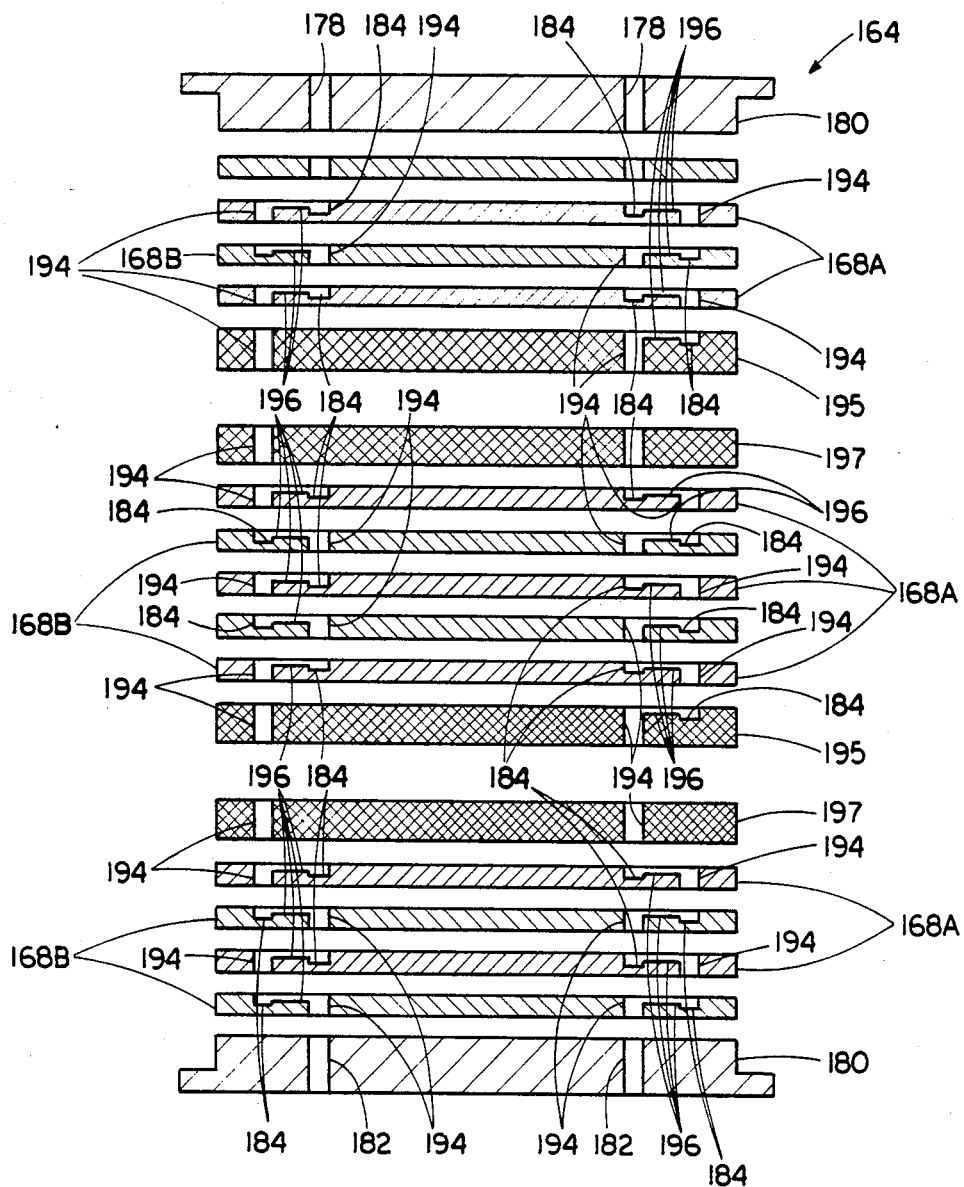

FIG. 42 is diagrammatic end elevational view, in vertically foreshortened form, of a fuel cell stack employing a fourth embodiment of the improved internal electrolyte supply system of the present invention having by-pass electrolyte flow passages at opposite ends of a pair of dual electrolyte flow grooves on the anode side of one bipolar plate of the cell stack, the electrolyte transport wicks located in the grooves are not shown in the sake of clarity.

Figure 43:
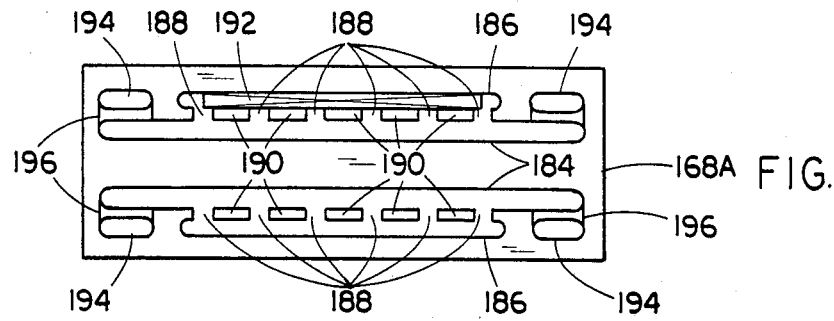
Figure 44:
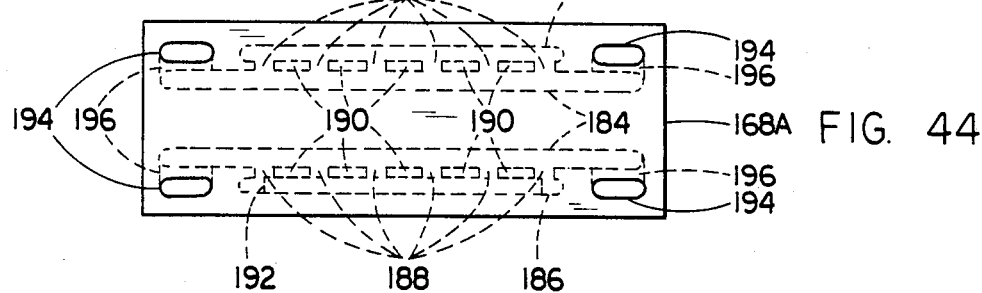

FIG. 43 and 44 are plan views of respective top anode and bottom cathode sides of one bipolar plate of the stack of FIG. 42, the plate having electrolyte flow passages adjacent to the opposite ends of the respective dual electrolyte flow grooves and with an electrolyte transport wick being shown in only one of the outboard ones of the dual grooves.

Figure 45:
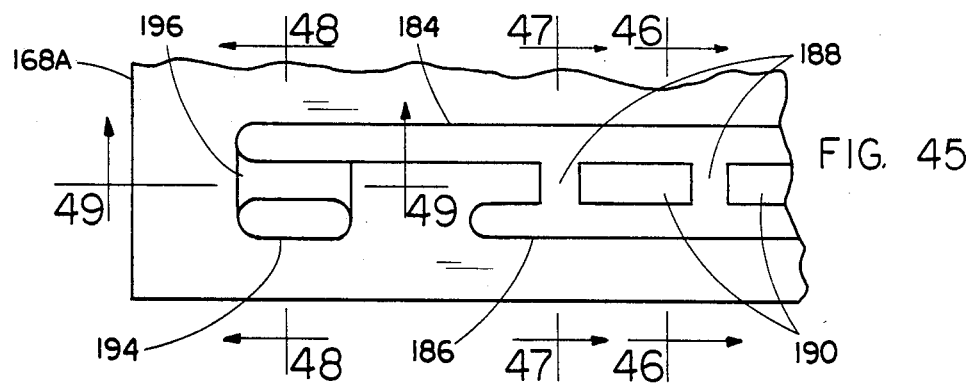

FIG. 45 is an enlarged fragmentary view of the lower left corner of the bipolar plate of FIG. 43, showing the channels interconnecting the dual electrolyte flow grooves and the electrolyte cascade flow step interconnecting the passage and inboard ones of the dual grooves of the plate.

Figure 46:
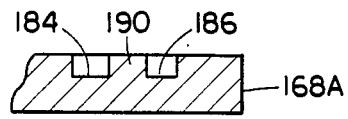

FIG. 46 is a fragmentary cross-sectional view of the bipolar plate taken along line 46—46 of FIG. 45 through the dual electrolyte flow grooves.

Figure 47:
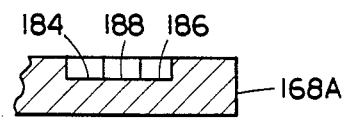

FIG. 47 is another fragmentary cross-sectional view of the same bipolar plate taken along line 47—47 of FIG. 45 through the dual electrolyte flow grooves and the channel interconnecting them.

Figure 48:
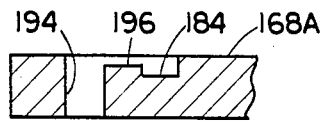

FIG. 48 is yet another fragmentary cross-sectional view of the same bipolar plate taken along line 48—48 of FIG. 45 across the electrolyte cascade flow step interconnecting the passage and inboard ones of the dual grooves of the plate.

Figure 49:
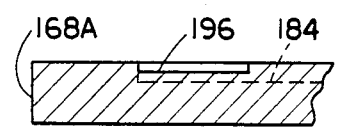

FIG. 49 is still another fragmentary longitudinal sectional view of the same bipolar plate taken along line 49—49 of FIG. 45 through the electrolyte cascade flow step of the plate.

Figure 50:
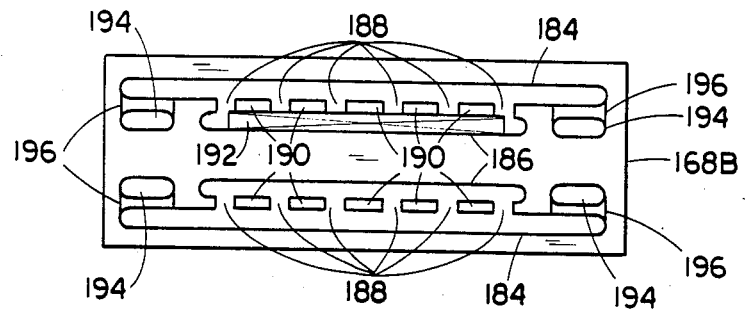
Figure 51:
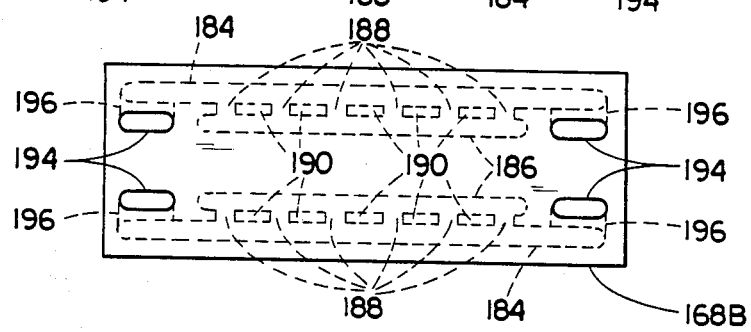

FIGS. 50 and 51 are plan views of respective top anode and bottom cathode sides of another bipolar plate of the stack of FIG. 42, the plate having electrolyte flow passages adjacent to the opposite ends of the respective dual electrolyte flow grooves and with an electrolyte transport wick being shown in only one of the inboard ones of the dual grooves.

Figure 52:
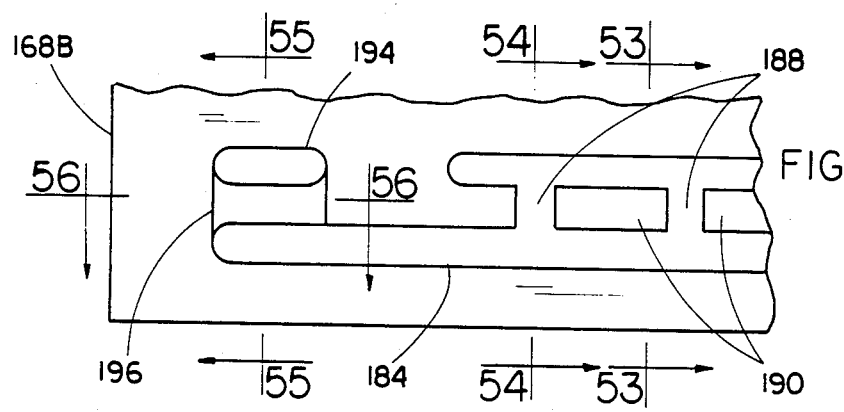

FIG. 52 is an enlarged fragmentary view of the lower left corner of the bipolar plate of FIG. 50, showing the channels interconnecting the dual electrolyte flow grooves and the electrolyte cascade flow step interconnecting the passage and outboard ones of the dual grooves of the plate.

Figure 53:
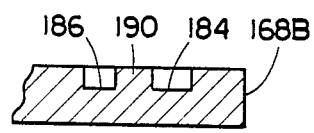

FIG. 53 is a fragmentary cross-sectional view of the bipolar plate taken along line 53—53 of FIG. 52 through the dual electrolyte flow grooves.

Figure 54:
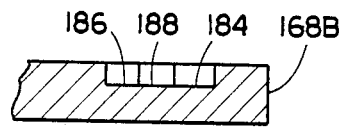

FIG. 54 is another fragmentary cross-sectional view of the same bipolar plate taken along line 54—54 of FIG. 52 through the dual electrolyte flow grooves and the channel interconnecting them.

Figure 55:
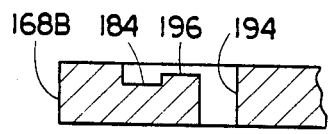

FIG. 55 is yet another fragmentary cross-sectional view of the same bipolar plate taken along line 55—55 of FIG. 52 across the electrolyte cascade flow step interconnecting the passage and outboard ones of the dual grooves of the plate.

Figure 56:
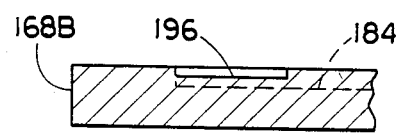

FIG. 56 is still another fragmentary longitudinal sectional view of the same bipolar plate taken along line 56—56 of FIG. 52 through the electrolyte cascade flow step of the plate.

Figure 57:
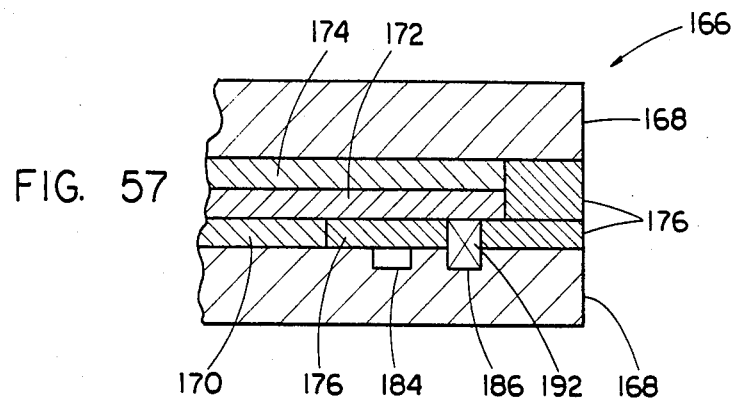

FIG. 57 is an enlarged fragmentary cross-sectional view of a typical fuel cell of the stack of FIG. 42 employing the bipolar plate of FIG. 43.

Figure 58:
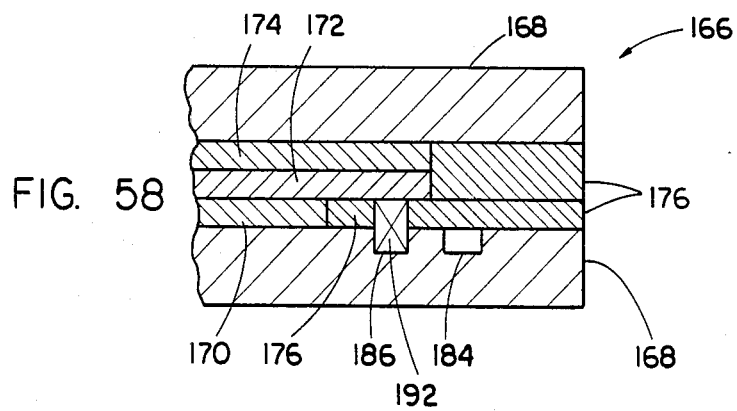

FIG. 58 is an enlarged fragmentary cross-sectional view of a typical fuel cell of the stack of FIG. 42 employing the bipolar plate of FIG. 50.

Figure 59:
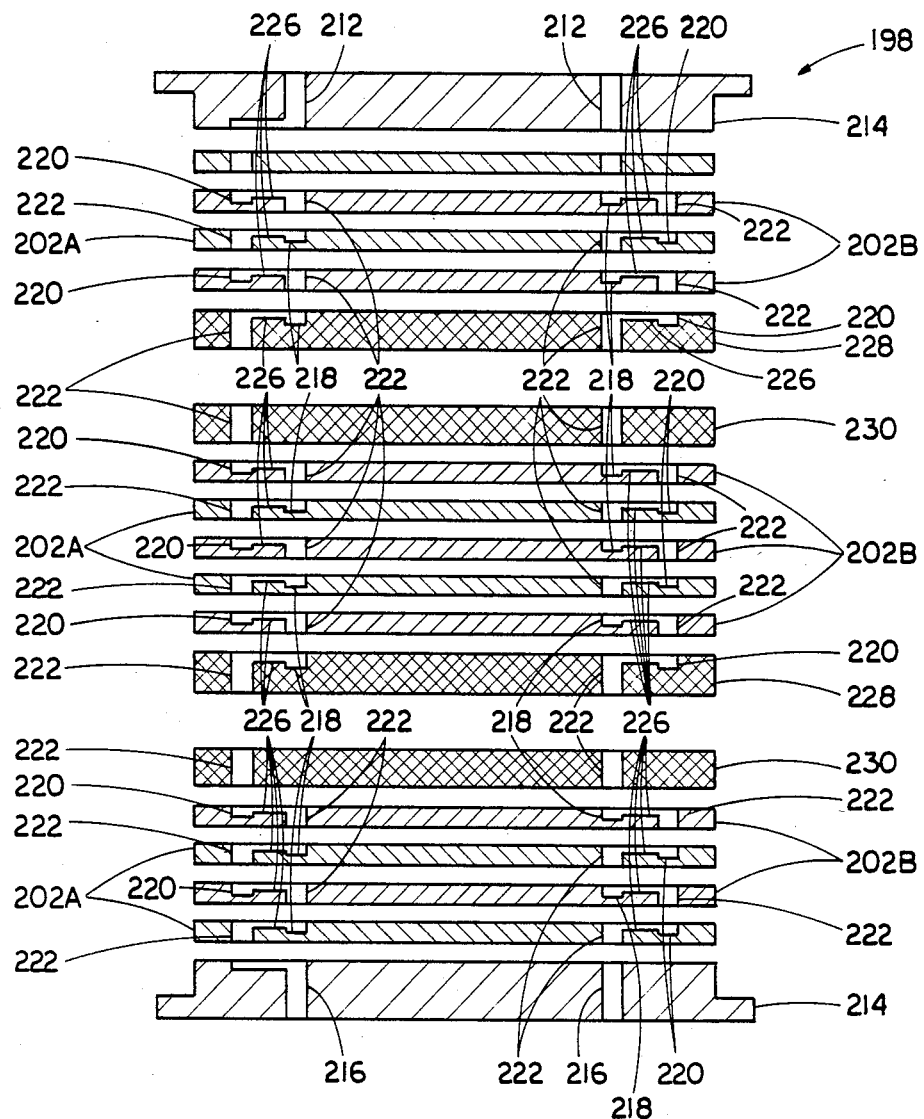

FIG. 59 is diagrammatic end elevational view, in vertically foreshortened form, of a fuel cell stack employing a fifth embodiment of the improved internal electrolyte supply system of the present invention having by-pass electrolyte flow passages at opposite ends of single electrolyte flow grooves on the anode side of one bipolar plate of the cell stack, the electrolyte transport wicks located in the grooves are not shown in the sake of clarity.

Figure 60:
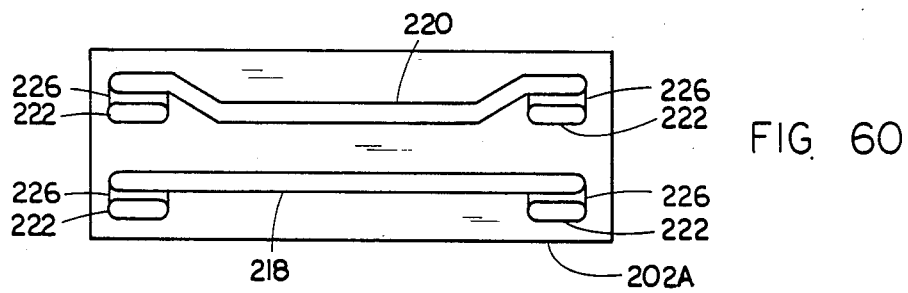
Figure 61:
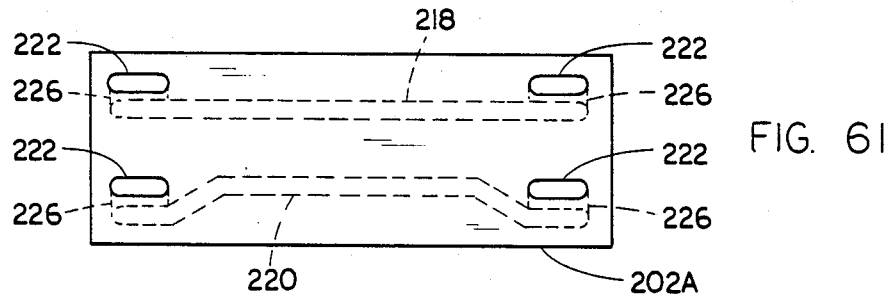

FIGS. 60 and 61 are plan views of respective top anode and bottom cathode sides of one bipolar plate of the stack of FIG. 59, the plate having electrolyte flow passages adjacent to the opposite ends of the respective electrolyte flow grooves and electrolyte transport wicks in the grooves.

Figure 62:
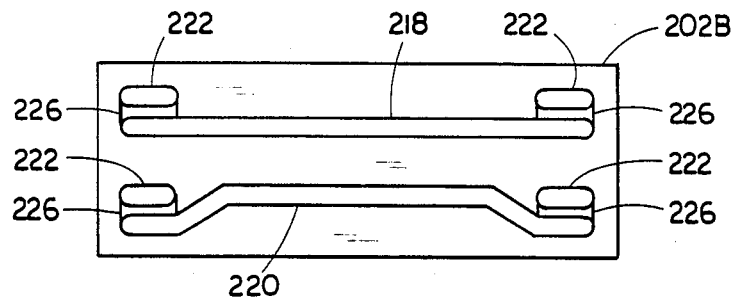
Figure 63:
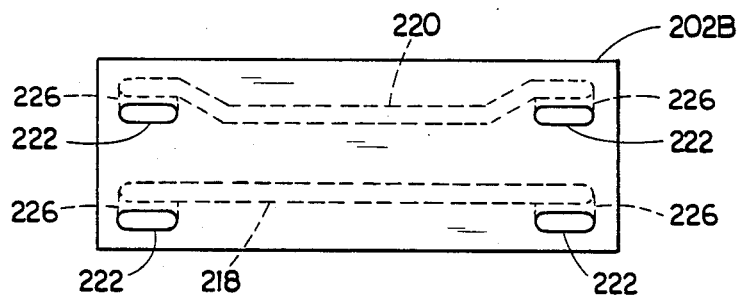

FIGS. 62 and 63 are plan views of respective top anode and bottom cathode sides of the bipolar plate of FIGS. 60 and 61 after being reversed by rotating it 180 degrees about a vertical axis.

Figure 64:
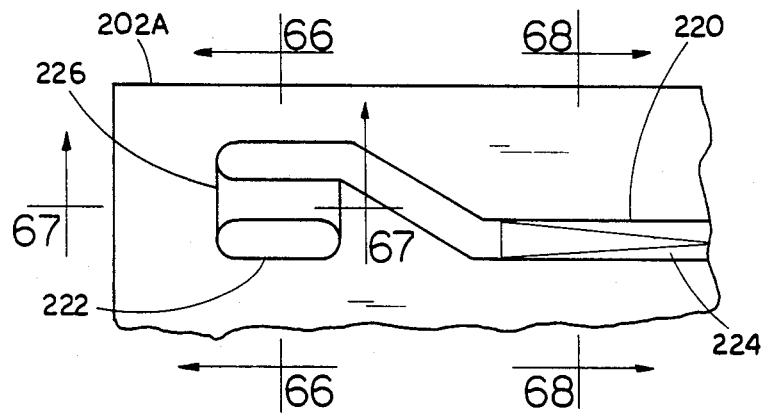
Figure 65:
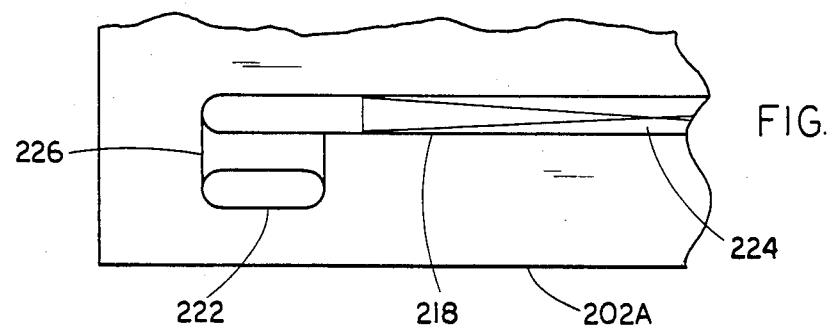

FIGS. 64 and 65 are enlarged fragmentary views of the upper and lower left corners of the bipolar plate of FIG. 60, showing the electrolyte flow grooves and the electrolyte cascade flow steps interconnecting the passages and grooves of the plate.

Figure 66:
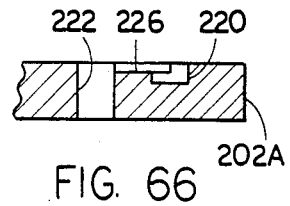

FIG. 66 is a fragmentary cross-sectional view of the bipolar plate taken along line 66—66 of FIG. 64 across the electrolyte cascade flow step interconnecting the passage and groove of the plate.

Figure 67:
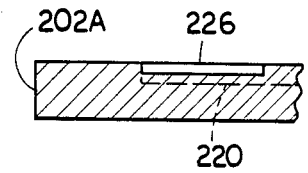

FIG. 67 is another fragmentary longitudinal sectional view of the same bipolar plate taken along line 67—67 of FIG. 64 through the electrolyte flow step of the plate.

Figure 68:
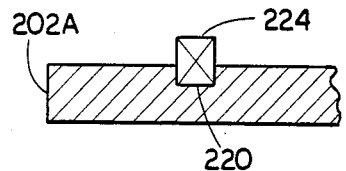

FIG. 68 is yet another fragmentary cross-sectional view of the same bipolar plate taken along line 68—68 of FIG. 64 across the electrolyte flow groove of the plate.

Figure 69:
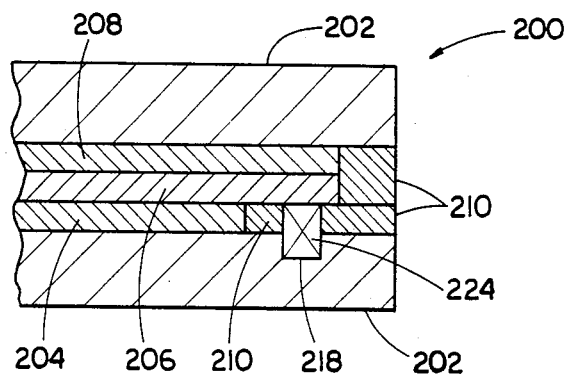

FIG. 69 is an enlarged fragmentary cross-sectional view of a typical fuel cell of the stack of FIG. 59 employing the bipolar plate of FIG. 43.

DETAILED DESCRIPTION OF THE INVENTION

In the following description, like reference characters designate like or corresponding parts throughout the several views. Also, in the following description, it is to be understood that such terms as "forward", "rearward", "left", "right", "upwardly", "downwardly", and the like, are words of convenience and are not to be construed as limiting terms.

In General

Figure 1:
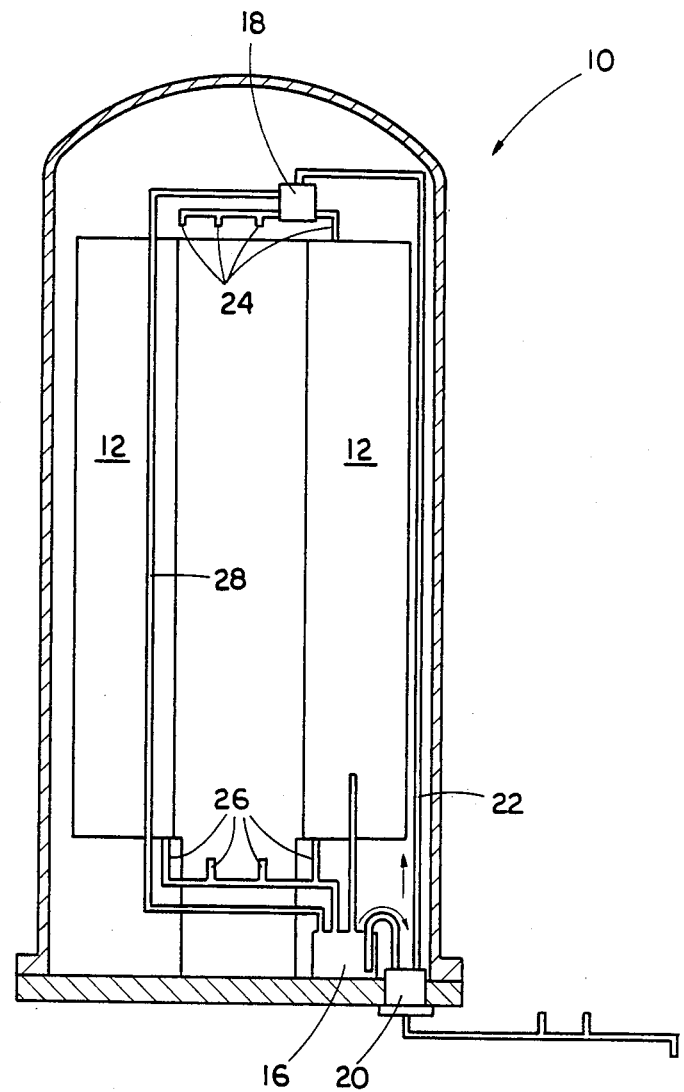
FIG. 1 is an elevational view, partly in section, of a fuel cell stack module, with portions omitted for purposes of clarity, which can incorporate the single pass internal electrolyte supply system of the prior art or any of the embodiments of the internal electrolyte supply system of the present invention.

Referring now to the drawings, and particularly to FIG. 1, there is shown an electrochemical fuel cell stack module, generally designated by the numeral 10, which includes a plurality of fuel cell stacks 12. Each fuel cell stack 12 contains a multiplicity of repeating fuel cells. One of the prior art fuel cells is diagrammatically illustrated in FIG. 11 and designated as 14, whereas respective fuel cells incorporating features of the various embodiments of the improved internal electrolyte supply system of the present invention are diagrammatically illustrated in FIGS. 26, 34, 41, 57, 58 and 69 and identified by reference numerals to be designated later in the description of those embodiments.

For maintaining the fuel cell stacks 12 supplied with electrolyte, the fuel cell stack module 10 also includes an electrolyte reservoir 16, a distribution block 18, and a pump 20 for supplying electrolyte from the reservoir 16 via a primary supply line 22 to the distribution block 18. The fuel cell stacks 12 are connected individually in flow communication with the electrolyte distribution block 18 and reservoir 16 by respective stack supply lines 24 and return or drain lines 26. Specifically, the distribution block 18 includes an electrolyte chamber (not shown) for each stack 12 in the module 10 and a single overflow chamber (not shown). The stack supply lines 24 interconnect electrolyte fill holes (not shown in FIG. 1) in the top of the respective stacks 12 with the distribution block electrolye chambers, whereas an overflow return line 28 connects the electrolyte overflow chamber of the distribution block 18 with the reservoir 16. For a more detailed description of this electrolyte supply system associated with the module 10, attention is directed to the first application cross-referenced above, the disclosure of which is incorporated herein by reference.

In operation, a predetermined electrolyte volume is forced by the pump 20 through the primary supply line 22 to the distribution block 18. Within the block 18, an equal amount of electrolyte is delivered to each electrolyte chamber. Excess electrolyte flows into the overflow chamber and is returned to the reservoir 16 through the overflow return line 28. Electrolyte from the chambers is delivered through the stack supply lines 24 to the fill holes in the tops of the respective stacks 12.

In order to avoid creation of a short circuit through the electrically-conductive electrolyte, and damage to the fuel cell stacks 12, electrolyte is delivered in predetermined periodic pulses of short duration by the pump 20 rather than by continuous flow. Gravitational force assists circulation of electrolyte through the fill holes and the internal supply system (both the prior art embodiment in FIG. 2 and the various embodiments of the improved system of the present invention in FIGS. 12, 27, 35, 42 and 59 to be described below) of the fuel cell stacks. Any electrolyte not absorbed passed out of the stacks 12 through the drain holes (not shown in FIG. 1) and is returned to the reservoir 16 through the drain lines 26.

Figure 11:
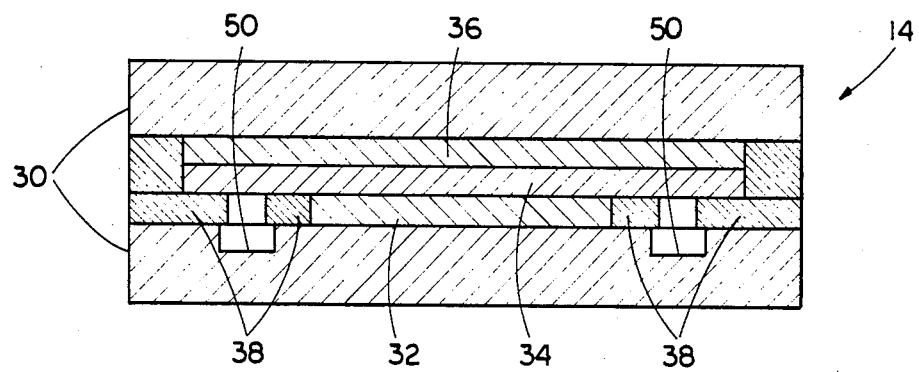
FIG. 11 is an enlarged cross-sectional view of a typical fuel cell of the stack of FIG. 2.

As mentioned, each fuel stack 12 of the module 10 includes a multiplicity of repeating fuel cells, such as designated 14 in the case of the prior art illustrated in FIG. 11, being arranged such that each cell is electrically connected in series with one another in a conventional manner (not shown). Each fuel cell, whether the prior art one 14 of FIG. 11 which will now be described or any of the fuel cells (whose reference numerals will be identified later) of FIGS. 26, 34, 41, 57, 58 and 69 associated with the various embodiments of the present invention, shares the same basic components. Typically, each fuel cell, for example cell 14 in FIG. 11, includes top and bottom bipolar plates 30 between which are sandwiched a lower anode electrode 32, an electrolyte-containing porous matrix 34 and an upper cathode electrode 36. Also, shims or gaskets 38 are ordinarily provided for sealing about the peripheries of the electrodes.

In an exemplary embodiment, each bi-polar plate 30 is composed of a relatively thick rigid material such as a compression molded graphite resin composite, while each electrode 32,36 is a thin sheet of a porous graphite material provided with a porous graphite fiber backing for added structural integrity. The matrix 34 is composed of thin tissue-like sheets made of porous grahite saturatable with an electrolytic acid, such as concentrated phosphoric acid. Many other materials and structures can also be used to compose the components of the fuel cell 14.

Preferably, hundreds of the repeating fuel cells 14 (again, only one is shown in FIG. 11) are united to form the fuel cell stack 12. Thus, the top bipolar plate 30 of each fuel cell also acts as the bottom bipolar plate 30 for the fuel cell immediately above it and the bottom bipolar plate 30 of each fuel cell also acts as the top bipolar plate for the fuel cell immediately below it. Also, a full fuel cell stack typically includes end plates 40 in the form of half-bipolar plates, with a top half-bipolar plate 40 serving as the upper end plate and a bottom half-bipolar plate 40 serving as the lower end plate. The stack 12 is held together by top and bottom compression plates 42 which contain the aforementioned electrolyte fill and drain holes, designated 44 and 46 in FIG. 2.

The bipolar plates 30 are typically provided on opposite sides with a set of process channels (not seen) including fuel channels on one side and oxidant channels on the other side. A fuel, such as hydrogen, organics or metals, flows through the fuel process channels, whereas an oxidant, such as a halogen, air or other oxygen-containing material, flows through the oxidant process channels. Fuel inlet and outlet manifold (not shown) and oxidant inlet and outlet manifolds (not shown) are typically attached to respective inlet and outlet regions of the fuel cell stacks 12 in communication with the fuel and oxidant channels to provide fuel and oxidant flows to and from the stack. Electrical power and heat are generated by the interaction of the fuel and oxidant through the electrodes 32,36 and electrolyte matrix 34. An exemplary fuel cell 14 utilizes hydrogen fuel, air as the oxidant and phosphoric acid as the electrolyte.

Figure 2:
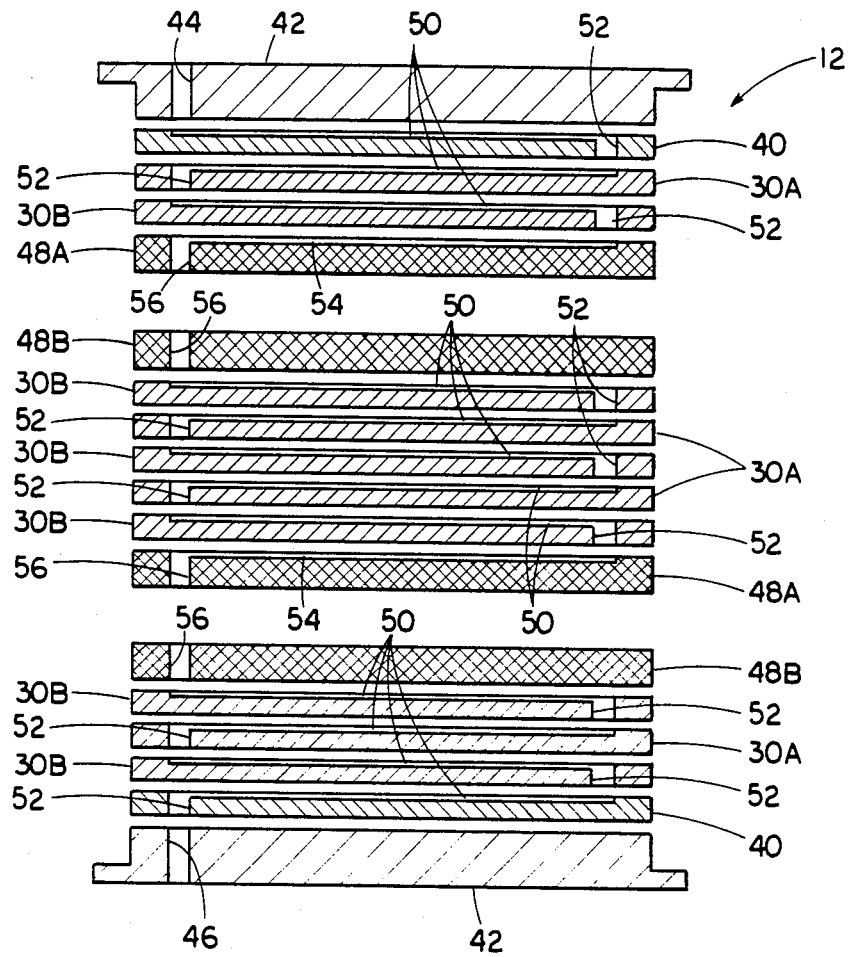
FIG. 2 is diagrammatic side elevational view, in vertically foreshortened form, of a fuel cell stack employing the prior art single pass internal electrolyte supply system having single electrolyte flow holes at alternating opposite ends of single electrolyte flow grooves on the anode side of one bipolar plate of the cell stack which together define a back and forth serpentine electrolyte flow path through the stack.
Figure 3:
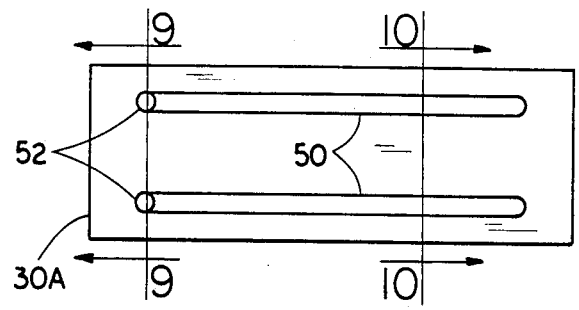
FIGS. 3 and 4 are plan views of respective top anode and bottom cathode sides of one bipolar plate of the stack of FIG. 2, the plate being reversible and having electrolyte flow holes at the left ends of the respective electrolyte flow grooves.
Figure 4:
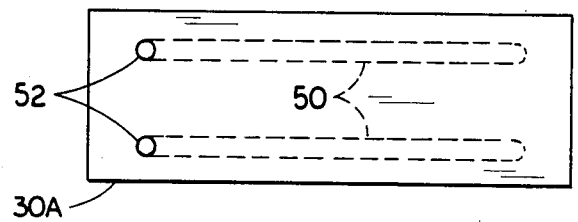
Figure 5:
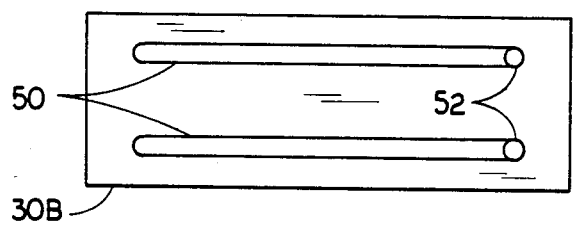
FIGS. 5 and 6 are plan views of respective top anode and bottom cathode sides of the bipolar plate of FIGS. 3 and 4 after being reversed by rotating it 180 degrees about a vertical axis.
Figure 6:
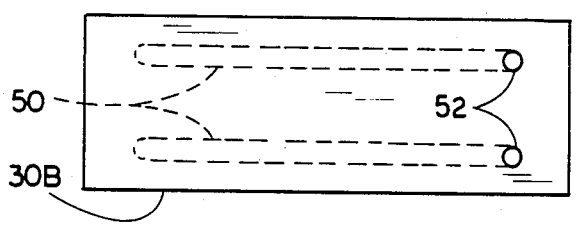

A substantial amount of heat is generated by the electrochemical reaction and, accordingly, each of the stacks 12 ordinarily includes cooling modules composed of a pair of plates 48, as seen in FIG. 2. Dependent upon the operating temperatures desired, the cooling modules are placed between the fuel cells 14 at selected positions within the stack 12. A cooling module may, for example, be placed at approximately seventy evenly spaced locations in the stack 12. Each module is preferably comprised of a material similar to that of the bipolar plates 30 and has air cooling passages (not shown) therethrough.

Prior Art System with Serpentine Flow Path Formed by Alternating Holes and Single Grooves (FIGS. 2–11)

The prior art internal electrolyte supply system in the fuel cell stack 12, as best seen overall in FIG. 2, interconnects the fill hole 44 in the top compression plate 42 and the drain hole 46 in the bottom compression plate and routes electrolyte through the stack 12 in a back and forth serpentine fashion. As also depicted in FIGS. 3 to 6, typical bipolar plates 30A and 30B (being identical but one rotated 180 degrees about a vertical axis with respect to the other when assembled in the stack) separate the fuel cells 14 (one cell being shown in FIG. 11) and are arranged in alternating fashion throughout the stack 12. Each plate 30 has single electrolyte flow grooves 50 (see also FIG. 9) defined on its upper anode-supporting side along opposite longitudinal edges thereof. Also, electrolyte flow passages 52 (see also FIG. 10) extend through the plates 30 in communicative relation with corresponding ones of a pair of opposite ends of the grooves.

Figure 7:
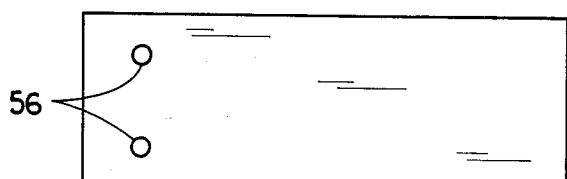
FIGS. 7 and 8 are plan views of respective top and bottom sides of a typical one of the cooling plates of the stack of FIG. 2, the plate being reversible and having a pair of electrolyte flow holes being alignable with either the left or right ends of the respective electrolyte flow grooves and with the electrolyte flow holes of either of the bipolar plates of FIGS. 3-6.
Figure 8:
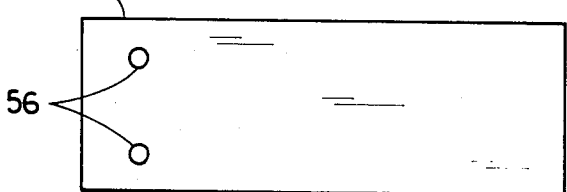
Figure 10:
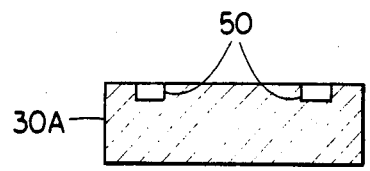
FIG. 10 is another cross-sectional view of the same bipolar plate taken along line 10—10 of FIG. 3 across the electrolyte flow grooves of the plate.
Figure 9:
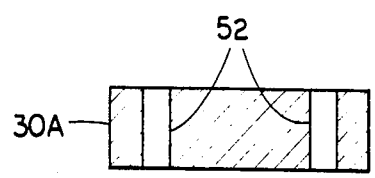
FIG. 9 is a cross-sectional view of the bipolar plate of the stack of FIG. 2 taken along line 9—9 of FIG. 3 across the electrolyte flow holes of the plate.

Additionally, each upper cooling plate 48A of the stack 12 has similar grooves 54 and passages 56 aligned with the passages 56 of the next upper plate 30 as shown in FIG. 2. Each lower cooling plate 48B only has the passages 56, as shown in FIGS. 2, 7 and 8, aligned with the passages 56 of the upper cooling plate 48A and with the grooves 50 of the next lower plate 30.

Only with the assistance of gravity, electrolyte flows through the cells 14 of the stack 12 along the serpentine path defined by the flow grooves 50,54 and passages 52,56 of the respective plates 30,48. However, since there is only the single path by which the electrolyte can pass through the stack 12 for supplying electrolyte to all of the cells therein, it will be readily appreciated that if an obstruction should develop in one of the grooves, for instance due to the matrix 34 (FIG. 11) sagging into one of the grooves over time, the electrolyte will not reach those cells beyond or below the location of the blockage. Further, those cells above the blockage will become flooded once the head pressure of the electrolyte rises sufficiently. It is such problems that the embodiments of the improved internal electrolyte supply system of the present invention, which will now be described, are particularly suited to alleviate.

First Embodiment of Improved System Having By-Pass Passages and Single Grooves (FIGS. 12–26)

Turning now to FIGS. 12 to 26, there is shown a fuel cell stack 58 and the respective details thereof, the stack incorporating the first embodiment of the improved internal electrolyte supply system of the present invention. The stack 58 is composed of a multiplicity of repeating fuel cells 60, one of which is partially seen in FIG. 26. The fuel cell 60 includes top and bottom bipolar plates 62 between which are sandwiched a lower anode electrode 64, an electrolyte-containing porous matrix 66 and an upper cathode electrode 68. Also, a gasket 70 is ordinarily provided for sealing about the peripheries of the electrodes.

Figure 12:
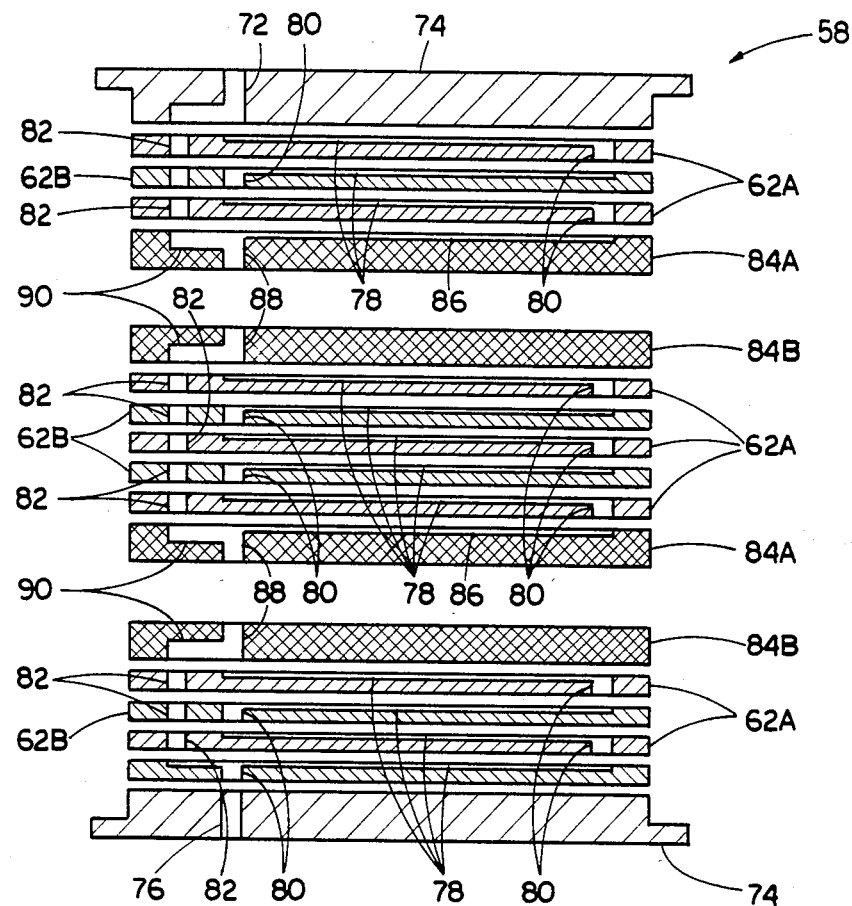
FIG. 12 is diagrammatic side elevational view, in vertically foreshortened form, of a fuel cell stack employing a first embodiment of the improved internal electrolyte supply system of the present invention having by-pass electrolyte flow passages and single electrolyte flow grooves on the anode side of one bipolar plate of the cell stack.

The first embodiment of the improved internal electrolyte supply system in the stack 58, as best seen overall in FIG. 12, interconnects the fill hole 72 in the top compression plate 74 and the drain hole 76 in the bottom compression plate 74 of the stack. The supply system routes electrolyte through the fuel cell stack 58 along a series of first paths each extending in a back and forth serpentine fashion through a group of fuel cells and along a series of second paths through the bipolar plates 62, each second path by-passing one of the groups of fuel cells in order to directly supply another group at lower elevations in the stack.

More particularly, as seen also in FIGS. 15 to 18, the first embodiment of the supply system incorporated by the stack 58 includes single electrolyte flow grooves 78 (see also FIGS. 22 and 23) defined on upper anode-supporting sides along opposite longitudinal edges of the bipolar plates 62A and 62B, and electrolyte flow openings 80 (see also FIGS. 23 and 25) extending through the bipolar plates in communicative flow relation with the grooves 78. Specifically, openings 80 are defined through the right ends of the grooves 78 in the plate 62A and through the left ends of the grooves 78 in the plate 62B. Given that the plates 62A and 62B are alternately assembled in the stack 58, the openings 80 are associated with alternating ones of the opposite ends of respective electrolyte flow grooves 78 such that the electrolyte flow grooves 78 and openings 80 of the cells define the respective first flow paths in a back and forth serpentine fashion in the cells with the electrolyte exposed to the matrices 66 of the cells.

Figure 15:
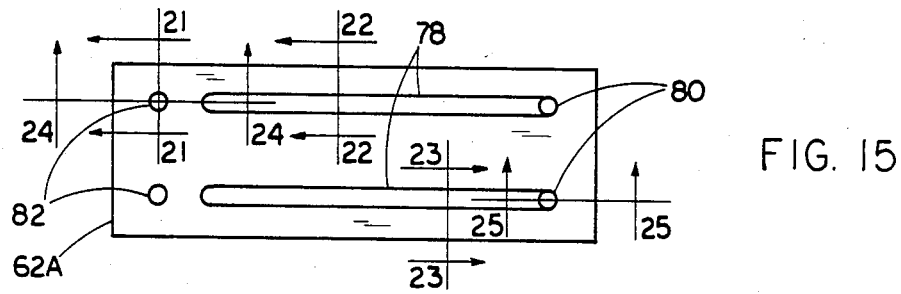
FIGS. 15 and 16 are plan views of respective top anode and bottom cathode sides of one bipolar plate of the stack of FIG. 12, the plate having electrolyte flow passages spaced from the left ends of the respective electrolyte flow grooves and electrolyte flow holes disposed at the right ends of the respective grooves.
Figure 16:
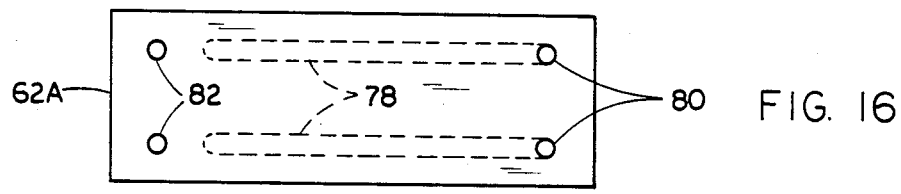
Figure 17:
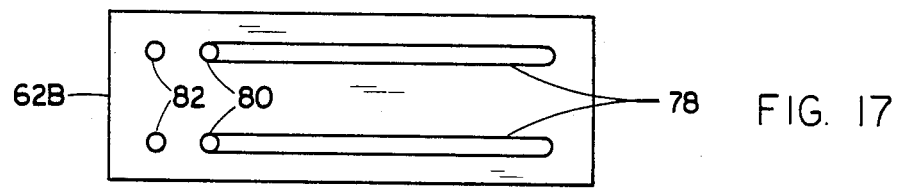
FIGS. 17 and 18 are plan views of respective top anode and bottom cathode sides of another bipolar plate of the stack of FIG. 12, the plate having electrolyte flow passages spaced from the left ends of the respective electrolyte flow grooves and electrolyte flow holes disposed at the left ends of the respective grooves.
Figure 18:
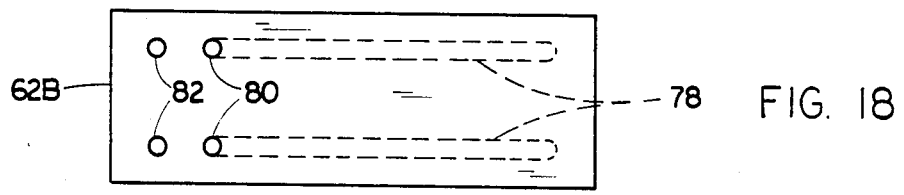

For repeatedly by-passing a particular group of fuel cells and directly supplying a lower group of fuel cells, as seen further in FIGS. 15 and 18, the first embodiment of the supply system incorporated by the stack 58 also includes electrolyte flow passages 82 (see also FIGS. 21, 22 and 24) extending through the bipolar plates 62A,62B of the cells. Since the passages 82 are disposed in spaced non-communicative flow relation to the left ends of the electrolyte flow grooves 78, as depicted in FIG. 12, groups of the passages 82 define the series of second paths which extend through the plates 62A,62B of the cell stack 58 and by-pass respective ones of the first paths through the cells so as to supply electrolyte directly to respective others of the first paths without first going through the ones of the first paths.

Figure 13:
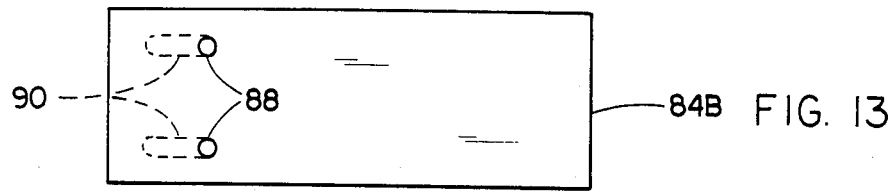
FIGS. 13 and 14 are plan views of respective top and bottom sides of a typical one of the cooling plates of the stack of FIG. 12.
Figure 14:
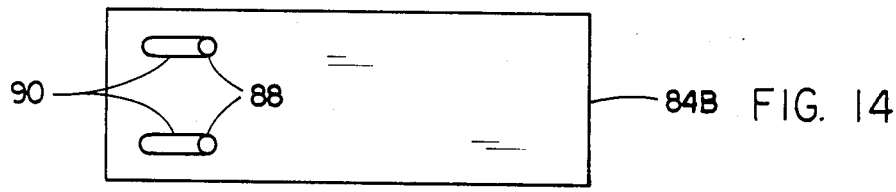
Figure 19:
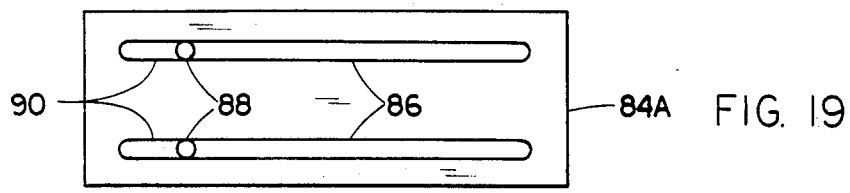
FIGS. 19 and 20 are plan views of respective top and bottom sides of the other of the cooling plates of the stack of FIG. 12.
Figure 20:
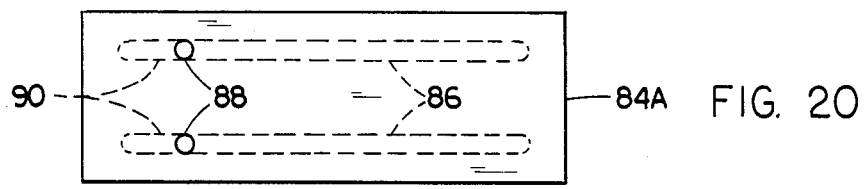
Figure 21:
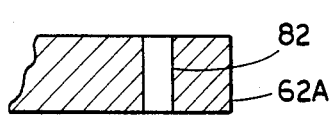
FIG. 21 is an enlarged fragmentary cross-sectional view of the bipolar plate of the stack of FIG. 15 taken along line 21—21 of FIG. 15 across one of the electrolyte flow passages of the plate.
Figure 22:
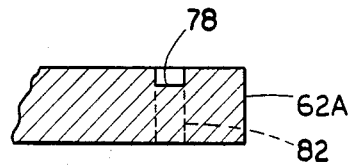
FIG. 22 is another enlarged fragmentary cross-sectional view of the same bipolar plate taken along line 22—22 of FIG. 15 across one of the electrolyte flow grooves of the plate.
Figure 23:
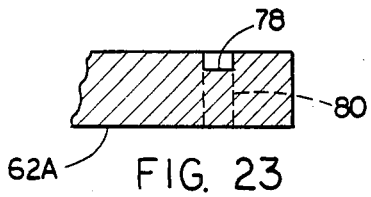
FIG. 23 is still another enlarged fragmentary cross-sectional view of the same bipolar plate taken along line 23—23 of FIG. 15 across the other of the electrolyte flow grooves of the plate.
Figure 24:
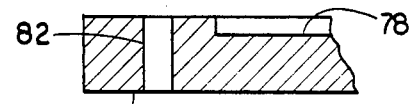
FIG. 24 is yet another enlarged fragmentary longitudinal sectional view of the same bipolar plate taken along line 24—24 of FIG. 15 through the one electrolyte flow passage and groove of the plate.
Figure 25:
FIG. 25 is a further enlarged fragmentary longitudinal sectional view of the same bipolar plate taken along line 25—25 of FIG. 15 through the electrolyte flow hole and other groove of the plate.
Figure 26:
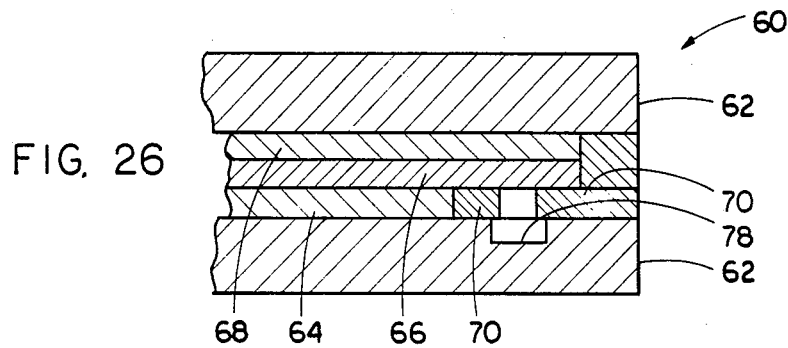
FIG. 26 is an enlarged fragmentary cross-sectional view of a typical fuel cell of the stack of FIG. 12.

Additionally, each upper cooling plate 84A of the stack 58 has similar grooves 86 and openings 88 aligned with the openings 80 in the bottom plate 62A of the one group of cells and connected to a short groove 90 aligned in communicative flow relation to the lower one passage 82 in the one series thereof, which bypasses the one group of cells, as seen in FIGS. 12, 19 and 20. The lower cooling plate 84B of the stack 58 has openings 88 aligned with openings 88 in the upper cooling plate 84A and with the grooves 78 of the top plate 62 in the next group of cells and has a short groove 90 connected in communicative flow relation with its openings 88 and aligned with an upper one passage 82 in the next series thereof in the top plate 62 of the next group of cells, which by-passes the next group of cells, as seen in FIGS. 12, 13 and 14.

Only with the assistance of gravity, electrolyte flows through the cells 60 of the stack 58 along the serpentine paths of the separate groups of cells defined by the flow grooves and openings 78,80 and along the by-pass paths defined by the passages 82 of the respective plates 62 which serpentine and by-pass paths are interconnected periodically in the stack 58 by the grooves 86,90 and openings 88 in the cooling plates 84A,84B. However, since there is now several different or multiple paths by which the electrolyte can pass through the stack 12 for supplying electrolyte to all of the cells therein, it will be readily appreciated that if an obstruction should develop in the serpentine path of one group of cells the electrolyte will still reach those cells beyond or below the location of the blockage. Further, those cells above the blockage will not flood since the alternative path will relieve any buildup of the head pressure of electrolyte above the blockage.

Second Embodiment of Improved System Having By-Pass Passages and Dual Grooves with Wicks (FIGS. 27–34)

Turning now to FIGS. 27 to 34, there is shown a fuel cell stack 92 and the respective details thereof, the stack incorporating the second embodiment of the improved internal electrolyte supply system of the present invention which is similar to the first embodiment thereof just described. Like before, the stack 92 is composed of a multiplicity of repeating fuel cells 94, one of which is partially seen in FIG. 34. The fuel cell 94 includes top and bottom bipolar plates 96 between which are sandwiched a lower anode electrode 98, an electrolyte-containing porous matrix 100 and an upper cathode electrode 102. Also, a gasket 104 is ordinarily provided for sealing about the peripheries of the electrodes.

The second embodiment of the improved internal electrolyte supply system in the stack 92, as best seen overall in FIG. 27, interconnects the fill hole 106 in the top compression plate 108 and the drain hole 110 in the bottom compression plate 108. Basically, the supply system routes electrolyte through the fuel cell stack 92 as in stack 58 described earlier, that is, along a series of first paths each extending in a back and forth serpentine fashion through a group of fuel cells and along a series of second paths each by-passing one of the groups of fuel cells in order to directly supply another at lower elevations in the stack. However, as described hereinafter, electrolyte flowing along the first paths is exposed to the matrices 100 of the cells of the stack 92 in a modified manner in the second embodiment.

Figure 29:
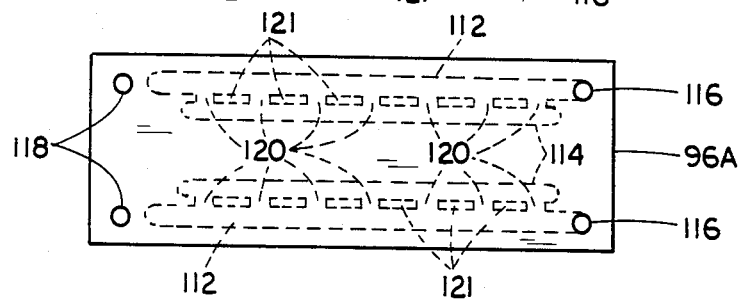
Figure 30:
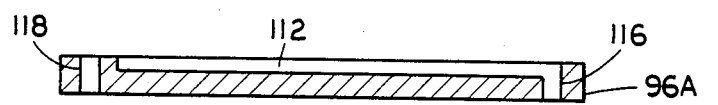
FIG. 30 is a longitudinal sectional view of one of the bipolar plates of the stack of FIG. 27 taken along line 30—30 of FIG. 28 through one of the electrolyte flow passages, grooves and holes of the plate.
Figure 31:
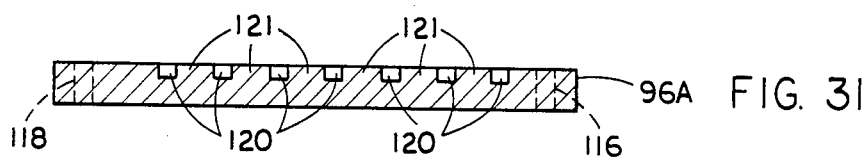
FIG. 31 is another longitudinal sectional view of the same bipolar plate taken along line 31—31 of FIG. 28 through the channels interconnecting the dual electrolyte flow grooves of the plate.

More particularly, the bipolar plates 96A,96B of the stack 92 of FIG. 27 are identical to the plates 62A,62B of the stack 58 of FIG. 12, except that, as seen in FIGS. 28 and 29, the plates 96A,96B include two pairs of dual electrolyte flow grooves 112,114. The grooves of each pair are defined in side-by-side communicative flow relation on upper anode-supporting sides and along one of the opposite longitudinal edges of the bipolar plates 96A,96B. As in the case of the plates 62A,62B, the plates 96A,96B also include electrolyte flow openings 116 and passages 118 (see also FIG. 30). Only the plate 96A is shown in FIGS. 28 and 29. The primary grooves 112 of the pairs are essentially identical to the grooves 78 in plates 62A,62B and the openings 116 and passages 118 are associated identically therewith. On the other hand, the other groove, the auxiliary groove 114, disposed inboard of the primary groove 112, is new. The auxiliary groove 114 does not directly connect with the electrolyte flow opening 116 and thus is not part of the separate serpentine flow paths through the various groups of cells. Instead, the auxiliary groove 114 extends generally parallel to and is interconnected with the primary groove 112 by a series of spaced apart cross flow channels 120 (see also FIGS. 31 and 33) defined in plates 96A,96B by intermittent walls 121 so as to provide the communicative flow relation therebetween. Furthermore, the primary groove 112 is covered by the gasket 104, as seen in FIG. 34.

Also, unlike the plates 62A,62B, the plates 96A,96B include an electrolyte transport wick 122 (see also FIG. 32) disposed in each of the auxiliary grooves 114 (although only a wick in one of the auxiliary grooves is illustrated) for facilitating transfer of electrolyte to the matrix. The wicks 122, composed for example of carbon fiber, engage the matrix 100 so as to both provide a reliable electrolyte path from the groove 114 to the matrix and support the matrix. With such arrangement, the electrolyte will be transported vertically to the matrix 100 even if the bottom of the groove 114 is wetted; it does not require that the groove 114 be filled with electrolyte to function. Preferably, the auxiliary, wick-filled groove 114 is at the same elevation as the primary, serpentine groove 112. Since the ends of the two grooves 112,114 are not interconnected, the auxiliary groove 114 forms a pocket to contain the ends of the wick 100 to prevent migration of it.

Additionally, the upper and lower cooling plates 124A,124B of the stack 92 are substantially identical to earlier plates 84A,84B, having similar grooves 126, openings 128 and short groove 130, as seen in FIG. 27, which are aligned in communicative flow relation to the grooves 112, openings 116 and passages 118 of the bipolar plates 96A,96B identical to the alignment of the cooling plates 84A,84B of the stack 58 with the plates 62A,62B thereof, as described earlier.

Third Embodiment of Improved System Having Passages at Opposite Ends of Single Grooves Having Wicks and Scoops (FIGS. 35–41)

Turning now to FIGS. 35 to 41, there is shown another fuel cell stack 132, and the respective details thereof, which incorporates the third embodiment of the improved internal electrolyte supply system of the present invention. The stack 132 is composed of a multiplicity of repeating fuel cells 134, one of which is partially seen in FIG. 41. The fuel cell 134 includes top and bottom bipolar plates 136 between which are sandwiched a lower anode electrode 138, an electrolyte-containing porous matrix 140 and an upper cathode electrode 142. Also, a gasket 144 is ordinarily provided for sealing about the peripheries of the electrodes.

The third embodiment of the improved internal electrolyte supply system in the stack 132, as best seen overall in FIG. 35, interconnects the pairs of fill holes 146 in opposite end portions of the top compression plate 148 and the pairs of drain holes 150 in the opposite end portions of the bottom compression plate 148 of the stack. The supply system routes electrolyte through the fuel cell stack 132 along a series of first paths each extending horizontally and directly through one of the fuel cells between the bipolar plates 136 thereof so as to expose electrolyte to the matrix 140 and along a series of second paths extending vertically through the stack 132 at opposite ends of the first horizontal paths. The second paths are in communicative flow relation to the first paths and adapted to supply electrolyte directly to the respective first paths.

More particularly, as seen also in FIGS. 36 and 37, the third embodiment of the supply system incorporated by the stack 132 includes single electrolyte flow grooves 152 (see also FIG. 38) defined on upper anode-supporting sides along opposite longitudinal edges of the bipolar plates 136 and electrolyte flow passages 154 extending through the plates 136 in communicative flow relation with the opposite ends of the electrolyte flow grooves 152. Also, means in the form of a upwardly curved scoop 156 (see also FIGS. 39 and 40) is mounted to the bipolar plates 136 at each opposite end of the groove 152 and extends into the flow passage 154 at the groove end for diverting electrolyte from the second paths of the passages 154 into the first paths of the grooves 152. Finally, an electrolyte transport wick 158, generally identical to wick 122 of the second embodiment, is disposed in each of the grooves 152 (although only one wick is shown in FIGS. 36 and 38) and is engaged with and supports the matrix 150 of the respective cell 134, as seen in FIG. 41, for facilitating transfer of electrolyte to the matrix. A cooling plate 160 also has pairs of passages 162 in opposite end portions thereof which align with the passages 154 in the bipolar plates 136.

The third embodiment of the supply system provides a simple, reliable and redundant electrolyte supply through the straight vertical passages 154 of the stack 132 and with the wicks 158 disposed in each of the grooves 152, a simple, reliable and redundant way to transport the electrolye from the supply passages 154 throughout the cells. The electrolyte has a preference for the carbon fiber wicks 158 over the vertical passages 154 and thus the ends of the wicks need only be near the passage surface to receive electrolyte; they do not need to stick into the passage 154 where they could contribute to blockage. The scoops 156 are provided to assist in diversion of the electrolyte without presenting a significant obstacle to electrolyte flow through the passages.

Fourth Embodiment of Improved System Having Cascade By-Pass Passages at Opposite Ends of Dual Grooves with Wicks (FIGS. 42-58)

Referring now to FIGS. 42 through 58, there is shown a fuel cell stack 164, and the respective details thereof, which incorporates the fourth embodiment of the improved internal electrolyte supply system of the present invention. The stack 164 is composed of a multiplicity of repeating fuel cells 166, two of which are partially seen in FIGS. 57 and 58. The fuel cell 166 includes top and bottom bipolar plates 168 between which are sandwiched a lower anode electrode 170, an electrolyte-containing porous matrix 172 and an upper cathode electrode 174. Also, a gasket 176 is ordinarily provided for sealing about the peripheries of the electrodes.

The fourth embodiment of the improved internal electrolyte supply system in the stack 164, as best seen overall in FIG. 42, interconnects the pairs of fill holes 178 in opposite end portions of the top compression plate 180 and the pairs of drain holes 182 in the opposite end portions of the bottom compression plate 180 of the stack. The fourth embodiment of the supply system is similar to the third embodiment just described in that it routes electrolyte through the fuel cell stack 164 along a series of first paths each extending horizontally and directly through one of the fuel cells between the bipolar plates 168 thereof so as to expose electrolyte to the matrix 172 and along a series of second paths extending vertically through the stack 164 adjacent to opposite ends of the first horizontal paths. The second paths are in communicative flow relation to the first paths and adapted to supply electrolyte directly to the respective first paths. However, the fourth embodiment of the supply system also incorporates features of the second embodiment as will become clearer below.

More particularly, as shown in FIGS. 43-44 and 50-51, the bipolar plates 168A,168B of the stack 164 of FIG. 42 include two pairs of dual electrolyte flow grooves 184,186 which are substantially identical to those (grooves 112,114) of the bipolar plates 96 in the second embodiment illustrated in FIGS. 28 and 29, except the auxiliary grooves 114 are located inboard in FIGS. 28 and 29 whereas they are located outboard in FIGS. 43 and 44. For example, the auxiliary grooves 186 extend generally parallel to and are interconnected with the primary grooves 184 by a series of spaced apart cross flow channels 188 (see also FIGS. 45-47 and 52-54) defined in the plates 168A,168B by intermittent walls 190 so as to provide the communicative flow relation therebetween. Also, primary grooves 184 are covered by the gasket 176, as seen in FIGS. 57 and 58. Further, an electrolyte transport wick 192 is disposed in the auxiliary grooves 186 of each cell (although only one wick is depicted in FIG. 43) and is engaged with and supports the matrix 172 thereof for facilitating transfer of electrolyte to the matrix 172 in the same manner as described earlier in the description of the second embodiment.

However, the bipolar plates 168A,168B of the stack 164 include means defined therein which supply electrolyte downwardly through the stack in a by-pass fashion and to the primary grooves 184 so as to produce a cascading electrolyte flow which is not found in the earlier embodiments. Such means include electrolyte flow passages 194 longitudinally aligned and spaced outwardly from the opposite ends of the auxiliary grooves 186 and extending through the plates 168A,168B of the cells in spaced communicative flow relation with the opposite ends of the primary grooves 184, and a dam or step 196 defined in the plates between the respective electrolyte flow passage 194 and primary groove 184. The steps 196 (see also FIGS. 48-49 and 55-56) establish the communicative flow relation and produces the cascading electrolyte flow between the passages 194 and primary grooves 184.

Finally, upper cooling plates 195 have the passages 194 in their left end portions and the groove 184, passages 194 and steps 196 in their right end portions, whereas lower cooling plates 197 have only passages 194 in their left and right end portions.

The offset or displacement of the passages 194 from primary grooves 184 via the steps 196 provides a by-pass type arrangement and causes small pools of electrolyte to form in the grooves 184,186 at every bipolar plate 168 which overflow to the next lower plate. In this arrangement, no head pressure exists in the flow of electrolyte.

Fifth Embodiment of Improved System Having Cascade By-Pass Passages at Opposite Ends of Single Grooves with Wicks (FIGS. 59–69)

Turning now to FIGS. 59 through 69, there is shown a fuel cell stack 198, and the respective details thereof, incorporating the fifth embodiment of the improved internal electrolyte supply system of the present invention which is similar to the fourth embodiment thereof just described. Like before, the stack 198 is composed of a multiplicity of repeating fuel cells 200, one of which is partially seen in FIG. 69. The fuel cell 200 includes top and bottom bipolar plates 202 between which are sandwiched a lower anode electrode 204, and electrolyte-containing porous matrix 206 and an upper cathode electrode 208. Also, a gasket 210 is ordinarily provided for sealing about the peripheries of the electrodes.

The fifth embodiment of the improved internal electrolyte supply system in the stack 198, as best seen overall in FIG. 59, interconnects the pairs of fill holes 212 in opposite end portions of the top compression plate 214 and the pairs of drain holes 216 in the opposite end portions of the bottom compression plate 214 of the stack. The fifth embodiment of the supply system, being similar to the fourth embodiment, routes electrolyte through the fuel cell stack 198 along a series of first paths each extending horizontally and directly through one of the fuel cells between the bipolar plates 202 thereof so as to expose electrolyte to the matrix 206 and along a series of second paths extending vertically through the stack 198 adjacent to opposite ends of the first horizontal paths. The second paths are in communicative flow relation to the first paths and adapted to supply electrolyte directly to the respective first paths. However, the fifth embodiment of the supply system also incorporates some modifications of the features found in the fourth embodiment as will become clearer below.

More particularly, as shown in FIGS. 60–61 and 62–63, the bipolar plates 202A,202B of the stack 198 of FIG. 59 are identical, with one plate merely being rotated about a longitudinal horizontal axis 180 degrees with respect to the other plate. The plates 202A,202B include single electrolyte flow grooves 218,220, one (218) being straight and the other (220) offset and aligned with one of the pairs of electrolyte flow passages 222 defined through opposite ends of the plates adjacent opposite ends of the grooves 218,220. It will be noted that there are no auxiliary grooves here, as in the fourth embodiment. Further, an electrolyte transport wick 224 is disposed in the straight and offset grooves 218,220 of each cell (although no wicks are shown in FIGS. 60 to 63, they are shown in FIGS. 64, 65, 68 and 69) and is engaged with and supports the matrix 206 thereof for facilitating transfer of electrolyte to the matrix.

Even though the bipolar plates 202A,202B of the fifth embodiment employ single grooves 218,220, they still have means defined therein, as in the fourth embodiment, which supply electrolyte downwardly through the stack in a by-pass fashion and to the straight and offset grooves 218,220 so as to produce a cascading electrolyte flow. Such means includes the above-mentioned electrolyte flow passages 222 transversely aligned and spaced laterally from the opposite ends of the grooves 218,220, and a dam or step 226 defined in the plates between the respective electrolyte flow passage 194 and opposite ends of the grooves 218,220. The steps 226 (see also FIGS. 64–69) establish a communicative flow relation and produce the cascading electrolyte flow between the passages 222 and the grooves 218,220.

Finally, upper cooling plates 228 have one or the other of the grooves 218,220 and have the passages 222 and steps 226 in their left and right end portions, whereas lower cooling plates 230 have only passages 222 in their left and right end portions.

It will be readily understood that an advantage of the fifth embodiment over the fourth embodiment is that the former requires only one bipolar plate design, whereas the latter requires two designs.

It will be further understood by those having ordinary skill in the art that the respective gaskets associated with the fuel cells of the various embodiments of the present invention described above are provided with holes or openings therein which register with the by-pass openings in the bipolar plates for flow communication of the electrolyte through the fuel cell stacks.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In a fuel cell stack having electrolyte feed and drain means and a plurality of stacked fuel cells, each fuel cell including bipolar plates separating said fuel cell from adjacent fuel cells in said stack thereof and an electrolyte-containing matrix disposed between said plates, an improved internal electrolyte supply system interconnecting said feed and drain means, comprising:
 (a) first means defined repeatedly throughout said fuel cell stack for flowing electrolyte along a series of first paths each extending directly through at least one cell between said plates thereof so as to expose electrolyte to said matrix of said cell; and
 (b) second means defined repeatedly throughout said fuel cell stack for flowing electrolyte along a series of second paths extending through said plates of said cell stack and by-passing respective ones of said first paths so as to supply electrolyte directly to respective others of said first paths without first going through said ones of said first paths.

2. The fuel cell stack as recited in claim 1, wherein said first means includes at least one electrolyte flow groove defined in one side of one of said plates of each cell of said stack.

3. The fuel cell stack as recited in claim 2, further comprising:
 an electrolyte transport wick disposed in said groove and engaged with said matrix of said respective cell for facilitating transfer of electrolyte to said matrix.

4. The fuel cell stack as recited in claim 2, wherein said second means includes an electrolyte flow passage extending through each plate of said respective cells in spaced relation to said electrolyte flow groove defined therein.

5. The fuel cell stack as recited in claim 4, wherein said electrolyte flow passage is in non-communicative flow relation to said electrolyte flow groove.

6. The fuel cell stack as recited in claim 4, wherein said electrolyte flow passage is in communicative flow relation to said electrolyte flow groove.

7. The fuel cell stack as recited in claim 6, further comprising:
a step defined in said plate between said electrolyte flow passage and groove which establishes said communicative flow relation and produces a cascading electrolyte flow therebetween.

8. The fuel cell stack as recited in claim 1, wherein said first means includes at least a pair of electrolyte flow grooves defined in side-by-side communicative flow relation in one side of one of said plates of each cell of said stack.

9. The fuel cell stack as recited in claim 8, further comprising:
at least one cross channel defined in said one side of said one cell plate between and interconnecting said pair of electrolyte flow grooves so as to provide said communicative flow relation therebetween.

10. The fuel cell stack as recited in claim 8, further comprising:
a series of spaced apart cross channels defined in said one side of said one cell plate between and interconnecting said pair of electrolyte flow grooves so as to provide said communicative flow relation therebetween.

11. The fuel cell stack as recited in claim 8, further comprising:
an electrolyte transport wick disposed in one of said grooves and engaged with said matrix of said respective cell for facilitating transfer of electrolyte to said matrix.

12. The fuel cell stack as recited in claim 11, wherein said wick is disposed in an inboard one of said pair of grooves.

13. The fuel cell stack as recited in claim 8, wherein said second means includes an electrolyte flow passage extending through each plate of said respective cells in spaced relation to said electrolyte flow grooves defined therein.

14. The fuel cell stack as recited in claim 13, wherein said electrolyte flow passage is in non-communicative flow relation to said electrolyte flow grooves.

15. The fuel cell stack as recited in claim 13, wherein said electrolyte flow passage is in communicative flow relation to said electrolyte flow grooves.

16. The fuel cell stack as recited in claim 15, further comprising:
a step defined in said plate between said electrolyte flow passage and groove which establishes said communicative flow relation and produces a cascading electrolyte flow therebetween.

17. In a fuel cell stack having electrolyte feed and drain means and a plurality of stacked fuel cells, each fuel cell including bipolar plates separating said fuel cell from adjacent fuel cells in said stack thereof and an electrolyte-containing matrix disposed between said plates, an improved internal electrolyte supply system interconnecting said feed and drain means, comprising:
(a) first means defined repeatedly throughout said fuel cell stack for flowing electrolyte along a series of first paths each extending in successive fashion directly through cells of a first group thereof between said plates of said cells so as to expose electrolyte to said matrices of said first group of cells; and (b) second means defined repeatedly throughout said fuel cell stack for flowing electrolyte along a series of second paths extending through said plates of said cell stack and by-passing respective ones of said first paths so as to supply electrolyte directly to respective others of said first paths without first going through said ones of said first paths.

18. The fuel cell stack as recited in claim 17, wherein said first means includes at least one electrolyte flow groove defined in one side of one of said plates of each cell of said first group thereof.

19. The fuel cell stack as recited in claim 18, further comprising:
an electrolyte transport wick disposed in one of said grooves and engaged with said matrices of said cells of said first group thereof for facilitating transfer of electrolyte to said matrices.

20. The fuel cell stack as recited in claim 18, wherein said second means includes an electrolyte flow passage extending through said plates of said cells of said first group thereof in spaced relation to said electrolyte flow grooves defined therein.

21. The fuel cell stack as recited in claim 20, wherein said electrolyte flow passage is in non-communicative flow relation to said electrolyte flow groove.

22. The fuel cell stack as recited in claim 18, wherein said first means further includes an electrolyte flow opening extending through each of said plates of said cells of said first group thereof in communicative flow relation to said electrolyte flow groove defined therein.

23. The fuel cell stack as recited in claim 22, wherein said electrolyte flow openings are defined in communicative flow relation with alterating ones of opposite ends of said respective electrolyte flow grooves such that said electrolyte flow openings and grooves of said cells of said first group define said first flow path in a back and forth serpentine fashion in said cells of said first group.

24. The fuel cell stack as recited in claim 17, wherein said first means includes at least a pair of electrolyte flow grooves defined in side-by-side communicative flow relation in one side of one of said plates of each cell of said first group thereof.

25. The fuel cell stack as recited in claim 24, further comprising:
at least one cross channel defined in said one side of said one plate of said each cell of said first group between and interconnecting said pair of electrolyte flow grooves so as to provide said communicative flow relation therebetween.

26. The fuel cell stack as recited in claim 24, further comprising:
a series of spaced apart cross channels defined in said one side of said one plate of said each cell of said first group between and interconnecting said pair of electrolyte flow grooves so as to provide said communicative flow relation therebetween.

27. The fuel cell stack as recited in claim 24, further comprising:
an electrolyte transport wick disposed in one of said grooves and engaged with said matrix of said each cell of said first group thereof for facilitating transfer of electrolyte to said matrix.

28. The fuel cell stack as recited in claim 27, wherein said wick is disposed in an inboard one of said pair of grooves.

29. The fuel cell stack as recited in claim 24, wherein said second means includes an electrolyte flow passage extending through said plates of cells of said first group thereof in spaced relation to said electrolyte flow grooves defined therein.

30. The fuel cell stack as recited in claim 29, wherein said electrolyte flow passage is in non-communicative flow relation to said electrolyte flow grooves.

31. The fuel cell stack as recited in claim 24, wherein said first means further includes an electrolyte flow opening extending through said plates of said cells of said first group thereof in communicative flow relation to one of said electrolyte flow grooves defined therein.

32. The fuel cell stack as recited in claim 31, wherein said electrolyte flow openings are defined in communicative flow relation with alterating ones of opposite ends of said respective ones of said electrolyte flow grooves such that said electrolyte flow openings and grooves of said cells of said first group thereof define said first flow path in a back and forth serpentine fashion in said cells of said first group.

33. In a fuel cell stack having electrolyte feed and drain means and a plurality of stacked fuel cells, each fuel cell including bipolar plates separating said fuel cell from adjacent fuel cells in said stack thereof and an electrolyte-containing matrix disposed between said plates, an improved internal electrolyte supply system interconnecting said feed and drain means, comprising:
  (a) first means defined repeatedly throughout said fuel cell stack for flowing electrolyte along a series of first paths each extending directly through one of said cells in said stack between said plates thereof so as to expose electrolyte to said matrix of said cell;
  (b) second means defined repeatedly throughout said fuel cell stack for flowing electrolyte along a series of second paths extending through said plates of said cell stack at opposite ends of said first paths, said second paths being in communicative flow relation to the first paths and adapted to supply electrolyte directly to the respective first paths; and
  (c) an electrolyte transport wick disposed along each of the first paths through the cells and engaged with the matrix of the respective cell for facilitating transfer of electrolyte thereto.

34. The fuel cell stack as recited in claim 33, wherein said first means includes at least one electrolyte flow groove defined in one side of one of said plates of each cell for flowing electrolyte along said first path through each cell.

35. The fuel cell stack as recited in claim 34, wherein each of said wicks is disposed in one groove of each cell and engaged with said matrix of said each cell for facilitating transfer of electrolyte to said matrix.

36. The fuel cell stack as recited in claim 33, wherein said second means includes an electrolyte flow passage extending through said plates of said cells in communicative flow relation with each opposite end of one of said electrolyte flow grooves defined therein.

37. The fuel cell stack as recited in claim 36, further comprising:
  a step defined in each of said plates between said respective electrolyte flow passage and groove which establishes said communicative flow relation and produces a cascading electrolyte flow therebetween.

38. The fuel cell stack as recited in claim 33, wherein said first means includes at least a pair of electrolyte flow grooves defined in side-by-side communicative flow relation in one side of one of said plates of each cell for flowing electrolyte along said first path through said cell.

39. The fuel cell stack as recited in claim 38, further comprising:
  at least one cross channel defined in said one side of said one plate of said each cell between and interconnecting said pair of electrolyte flow grooves so as to provide said communicative flow relation therebetween.

40. The fuel cell stack as recited in claim 38, further comprising:
  a series of spaced apart cross channels defined in said one side of said one plate of said each cell between and interconnecting said pair of electrolyte flow grooves so as to provide said communicative flow relation therebetween.

41. The fuel cell stack as recited in claim 38, wherein each of said wicks is disposed in one of said grooves of said each cell and engaged with said matrix of said cell for facilitating transfer of electrolyte to said matrix.

42. The fuel cell stack as recited in claim 38, wherein said second means includes an electrolyte flow passage extending through said plates of said cells in communicative flow relation with each opposite end of the other of said electrolyte flow grooves defined therein which does not contain said wick.

43. The fuel cell stack as recited in claim 42, further comprising:
  a step defined in each of said plates between said respective electrolyte flow passage and said other groove which establishes said communicative flow relation and produces a cascading electrolyte flow therebetween.

44. In a fuel cell stack having electrolyte feed and drain means and a plurality of stacked fuel cells, each fuel cell including bipolar plates separating said fuel cell from adjacent fuel cells in said stack thereof and an electrolyte-containing matrix disposed between said plates, an improved internal electrolyte supply system interconnecting said feed and drain means, comprising:
  (a) first means defined repeatedly throughout the said fuel cell stack for flowing electrolyte along a series of first paths each extending directly through one of said cells in said stack between said plates thereof so as to expose electrolyte to said matrix of said cell;
  (b) second means defined repeatedly throughout said fuel cell stack for flowing electrolyte along a series of second paths extending through said plates of said cell stack at opposite ends of said first paths, said second paths being in communicative flow relation to said first paths and adapted to supply electrolyte directly to said respective first paths; and
  (c) third means defined in said plates between said first and second means which establish said communicative flow relation and produce a cascading electrolyte flow therebetween.

45. The fuel cell stack as recited in claim 44, wherein said first means includes at least one electrolyte flow groove defined in one side of one of said plates of cell for flowing electrolyte along said first path through each cell.

46. The fuel cell stack as recited in claim 45, further comprising:
  an electrolyte transport wick disposed in one groove of each cell and engaged with said matrix of said each cell for facilitating transfer of electrolyte to said matrix.

47. The fuel cell stack as recited in claim 44, wherein said second means includes an electrolyte flow passage extending through said plates of said cells in communicative flow relation with each opposite end of one of said electrolyte flow grooves defined therein.

48. The fuel cell stack as recited in claim 47, wherein said third means includes a step defined in each of said plates between said respective electrolyte flow passage and groove which establishes said communicative flow relation and produces said cascading electrolyte flow therebetween.

49. The fuel cell stack as recited in claim 44, wherein said first means includes at least a pair of electrolyte flow grooves defined in side-by-side communicative flow relation in one side of one of said plates of each cell for flowing electrolyte along said first path through said cell.

50. The fuel cell stack as recited in claim 49, further comprising:
    at least one cross channel defined in said one side of said plate of said each cell between and interconnecting said pair of electrolyte flow grooves so as to provide said communicative flow relation therebetween.

51. The fuel cell stack as recited in claim 49, further comprising:
    a series of spaced apart cross channels defined in said one side of said one plate of said each cell between and interconnecting said pair of electrolyte flow grooves so as to provide said communicative flow relation therebetween.

52. The fuel cell stack as recited in claim 49, further comprising:
    an electrolyte transport wick disposed in one of said grooves of said each cell and engaged with said matrix of said cell for facilitating transfer of electrolyte to said matrix.

53. The fuel cell stack as recited in claim 52, wherein said second means includes an electrolyte passage extending through said plates of said cells in communicative flow relation with each opposite end of the other of said electrolyte flow grooves defined therein which do not contain said wick.

54. The fuel cell stack as recited in claim 49, wherein said third means includes a step defined in each of said plates between said respective electrolyte flow passage and said other of said grooves which establishes said communicative flow relation and produces said cascading electrolyte flow therebetween.

55. In a fuel cell stack having electrolyte feed and drain means and a plurality of stacked fuel cells, each fuel cell including bipolar plates separating said fuel cell from adjacent fuel cells in said stack thereof and an electrolyte-containing matrix disposed between said plates, an improved internal electrolyte supply system interconnecting said feed and drain means, comprising:
    (a) first means defined repeatedly throughout said fuel cell stack for flowing electrolyte along a series of first paths each extending directly through one of said cells in said stack between said plates thereof so as to expose electrolyte to said matrix of said cell;
    (b) second means defined repeatedly throughout said fuel cell stack for flowing electrolyte along a series of second paths extending through said plates of said cell stack at opposite ends of said first paths, said second paths being in communicative flow relation to said first paths and adapted to supply electrolyte directly to said respective first paths; and
    (c) third means disposed at said opposite ends of each of said first paths and extending into said second paths for diverting electrolyte from said second paths to said first paths.

56. The fuel cell stack as recited in claim 55, further comprising:
    an electrolyte transport wick disposed along each first path through said one cell and engaged with the matrix of said respective cell for facilitating transfer of electrolyte thereto.

57. The fuel cell stack as recited in claim 55, wherein said first means includes an electrolyte flow groove defined in one side of one of said plates of each cell for flowing electrolyte along said first path through each cell.

58. The fuel cell stack as recited in claim 57, further comprising:
    an electrolyte transport wick disposed in said groove of each cell and engaged with said matrix of said each cell for facilitating transfer of electrolyte to said matrix.

59. The fuel cell stack as recited in claim 57, wherein said third means includes a scoop mounted to said one plate at each opposite end of said groove.

60. The fuel cell stack as recited in claim 55, wherein said second means includes an electrolyte flow passage extending through said plates of said cells in communicative flow relation with each opposite end of said electrolyte flow grooves defined therein.

61. The fuel cell stack as recited in claim 60, wherein said third means includes a scoop mounted to said one plate at each opposite end of said groove and extending into said electrolyte flow passages at said opposite ends of said groove.

* * * * *